(12) United States Patent
Chang et al.

(10) Patent No.: US 12,405,411 B2
(45) Date of Patent: Sep. 2, 2025

(54) OPTICAL LENS ASSEMBLY, IMAGING APPARATUS AND ELECTRONIC DEVICE

(71) Applicant: LARGAN PRECISION CO., LTD., Taichung (TW)

(72) Inventors: Pei-Chi Chang, Taichung (TW); Hung-Shuo Chen, Taichung (TW); Chun-Hung Teng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 749 days.

(21) Appl. No.: 17/534,564

(22) Filed: Nov. 24, 2021

(65) Prior Publication Data

US 2022/0163710 A1 May 26, 2022

Related U.S. Application Data

(60) Provisional application No. 63/118,030, filed on Nov. 25, 2020.

(30) Foreign Application Priority Data

Oct. 7, 2021 (TW) .................................. 110137381

(51) Int. Cl.
*G02B 5/20* (2006.01)
*G02B 7/02* (2021.01)
(Continued)

(52) U.S. Cl.
CPC .............. *G02B 5/208* (2013.01); *G02B 7/021* (2013.01); *G02B 13/14* (2013.01); *H04N 23/54* (2023.01)

(58) Field of Classification Search
CPC ........ G02B 5/208; G02B 7/021; G02B 13/14; G02B 13/0035; G02B 5/281;
(Continued)

(56) References Cited

U.S. PATENT DOCUMENTS 5,973,827 A * 10/1999 Chipper ............. G02B 27/4272
359/356
8,953,262 B2 2/2015 Lee
(Continued)

FOREIGN PATENT DOCUMENTS

CN 105589123 B 9/2018
CN 110361831 A 10/2019
(Continued)

*Primary Examiner* — William R Alexander
*Assistant Examiner* — Mackenzi Waddell
(74) *Attorney, Agent, or Firm* — McClure, Qualey & Rodack, LLP

(57) ABSTRACT

An optical lens assembly includes at least three optical lens elements. At least one of the optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the optical lens elements includes a long-wavelength absorbing material, and the optical lens element including the long-wavelength absorbing material is made of a plastic material.

25 Claims, 5 Drawing Sheets

(51) Int. Cl.
*G02B 13/14* (2006.01)
*H04N 23/54* (2023.01)

(58) Field of Classification Search
CPC .............. G02B 13/002; G02B 13/0055; G02B 13/008; G02B 13/18; G03B 17/12; G03B 30/00
See application file for complete search history.

(56) References Cited

U.S. PATENT DOCUMENTS

| | | | |
|---|---|---|---|
| 2005/0013018 A1 | 1/2005 | Ning | |
| 2005/0179995 A1 | 8/2005 | Nikolov et al. | |
| 2005/0180014 A1 | 8/2005 | Nikolov et al. | |
| 2005/0181128 A1 | 8/2005 | Nikolov et al. | |
| 2006/0056061 A1 | 3/2006 | Chen | |
| 2006/0291061 A1* | 12/2006 | Iyama | H04N 23/55 359/614 |
| 2008/0100910 A1* | 5/2008 | Kim | G02B 5/282 359/356 |
| 2011/0069378 A1* | 3/2011 | Lin | G02B 13/14 359/356 |
| 2012/0243077 A1* | 9/2012 | Osawa | H01L 27/14621 359/356 |
| 2014/0016188 A1 | 1/2014 | Liu | |
| 2015/0062695 A1 | 3/2015 | Chu et al. | |
| 2015/0146057 A1 | 5/2015 | Konishi et al. | |
| 2018/0067231 A1 | 3/2018 | Chang et al. | |
| 2018/0067242 A1 | 3/2018 | Lai | |
| 2018/0231739 A1 | 8/2018 | Bone et al. | |
| 2019/0004294 A1 | 1/2019 | Baba | |
| 2019/0064485 A1 | 2/2019 | Arita | |
| 2019/0317253 A1 | 10/2019 | Huang et al. | |
| 2019/0317257 A1 | 10/2019 | Chang et al. | |
| 2020/0025679 A1 | 1/2020 | Nygren et al. | |
| 2020/0150406 A1 | 5/2020 | Chen et al. | |
| 2022/0035125 A1 | 2/2022 | Yang et al. | |

FOREIGN PATENT DOCUMENTS

| | | | | |
|---|---|---|---|---|
| JP | 6414083 B2 * | 10/2018 | ......... | G02B 13/0045 |
| JP | 2019012121 A | 1/2019 | | |
| TW | 201317660 A | 5/2013 | | |
| TW | 201944116 A | 11/2019 | | |
| TW | M591177 U | 2/2020 | | |
| TW | 202204961 A | 2/2022 | | |

* cited by examiner

OPTICAL LENS ASSEMBLY, IMAGING APPARATUS AND ELECTRONIC DEVICE

RELATED APPLICATIONS

This application claims priorities to U.S. Provisional Application Ser. No. 63/118,030, filed Nov. 25, 2020, and Taiwan Application Serial Number 110137381, filed Oct. 7, 2021, which are herein incorporated by references.

BACKGROUND

Technical Field

The present disclosure relates to an optical lens assembly and an imaging apparatus. More particularly, the present disclosure relates to an optical lens assembly and an imaging apparatus which are able to filter infrared rays.

Description of Related Art

An optical lens assembly consists of a lens group and an image sensing element. Since the image sensing element is able to sense infrared rays other than visible light, an infrared filter element needs to be disposed. A conventional method for filtering infrared rays is to coat a planar element, so as to prevent the image sensing element from sensing infrared rays and causing color shift. However, reflective coating technique, which leads to interference, will cause reflection and light-leakage where the incident light has a large incident angle, and an absorbing blue glass is further added to solve the light-leakage problem in the conventional method.

Therefore, the technique of making an infrared filtering coating on the surface of blue glass has also been developed to achieve the goal of cutting down on the number of elements. However, coated blue glass is high-cost, difficult to be miniaturized and fragile. Even though the infrared filtering coating can be arranged on a surface of a plastic lens element, it is unable to effectively solve the defect of light leaking at large angle. When the light passes through the filtering coating on the surface of the plastic lens element, severe reflection occurs at the position where light is incident with a large angle as compared to the central position where light is incident perpendicularly. The light with large incident angle at an off-axis region of the lens element will cause the wavelength of transmittance shifting, resulting in light-leakage and reflection problems. When the reflecting light in the optical system diffuses, undesired light will enter the sensing element as imaging, which causes color shift by interfering the true color. Therefore, the blue glass is still irreplaceable.

Moreover, light at the off-axis region near a maximum effective diameter position usually causes band-pass wavelength shifting, resulting in the problem of insufficient color uniformity of the images. When the infrared filtering coating is made on the surface of the lens element with severe curvature radius change, the change of reflective angle of light passing through the filtering coating is more difficult to be controlled.

As the requirement of imaging quality increases, the number of lens elements is also increases to obtain better imaging quality and correction of aberration. In order to make the imaging color of the lens assembly closer to the reality and achieve advantage of miniaturizing the lens assembly, a method of cutting down the number of elements in the optical system should be developed, and an alternative technique should be developed as cutting off the blue glass planar element. Therefore, there is an urgent need for an innovating technique for cutting down the number of elements as well as having high imaging quality.

SUMMARY

According to an aspect of the present disclosure, an optical lens assembly includes at least three optical lens elements. At least one of the optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the optical lens elements includes a long-wavelength absorbing material, and the optical lens element including the long-wavelength absorbing material is made of a plastic material. When a maximum of an incident angle of a chief ray in all fields on the surface of the optical lens element including the infrared filtering coating is AICmax, an average transmittance between a wavelength of 500 nm-600 nm of the optical lens assembly is T5060, and an average transmittance between a wavelength of 700 nm-1000 nm of the optical lens assembly is T70100, the following conditions are satisfied: AICmax≤40 degrees; 80%≤T5060; and T70100≤10%.

According to one another aspect of the present disclosure, an imaging apparatus includes the optical lens assembly of the aforementioned aspect and an image sensor disposed on an image surface of the optical lens assembly.

According to still another aspect of the present disclosure, an electronic device, which is a mobile device, includes the imaging apparatus of the aforementioned aspect.

According to still another aspect of the present disclosure, an electronic device, which is a mobile device, includes the optical lens assembly of the aforementioned aspect, and the optical lens assembly further includes an image sensor and a cover glass. The image sensor is disposed on an image surface of the optical lens assembly, and the cover glass is disposed on a surface of the image sensor.

According to still another aspect of the present disclosure, an electronic device, which is a mobile device, includes the optical lens assembly of the aforementioned aspect. A transmittance at a wavelength of 1050 nm of the optical lens element including the long-wavelength absorbing material of the optical lens assembly is smaller than a transmittance at a wavelength of 500 nm thereof, and the optical lens assembly further includes an image sensor disposed on an image surface of the optical lens assembly.

According to still another aspect of the present disclosure, an optical lens assembly includes at least one optical lens element and at least one optical element. At least one of the optical lens element includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. The optical element is disposed at an image side of the optical lens element, and at least one of the optical element includes a long-wavelength absorbing material. When a maximum of an incident angle of a chief ray in all fields on the surface of the optical lens element including the infrared filtering coating is AICmax, an average transmittance between a wavelength of 500 nm-600 nm of the optical lens assembly is T5060, and an average transmittance between a wavelength of 700 nm-1000 nm of the optical lens assembly is T70100, the following conditions are satisfied: AICmax≤40 degrees; 80%≤T5060; and T70100≤10%.

According to still another aspect of the present disclosure, an electronic device, which is a mobile device, includes the optical lens assembly of the aforementioned aspect.

According to still another aspect of the present disclosure, an optical lens assembly includes at least one optical lens element and at least one optical element. The optical element includes an anti-reflective coating, and the anti-reflective coating is arranged on an object-side surface or an image-side surface of the optical element. At least one of the optical lens element includes an infrared filtering coating, the optical lens element including the infrared filtering coating is made of a plastic material, the infrared filtering coating is arranged on an object-side surface or an image-side surface of the optical lens element, and a surface of the optical lens element including the infrared filtering coating is aspheric. When an average transmittance between a wavelength of 500 nm-600 nm of the optical lens assembly is T5060, and an average transmittance between a wavelength of 700 nm-1000 nm of the optical lens assembly is T70100, the following conditions are satisfied: 80%≤T5060; and T70100≤10%.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
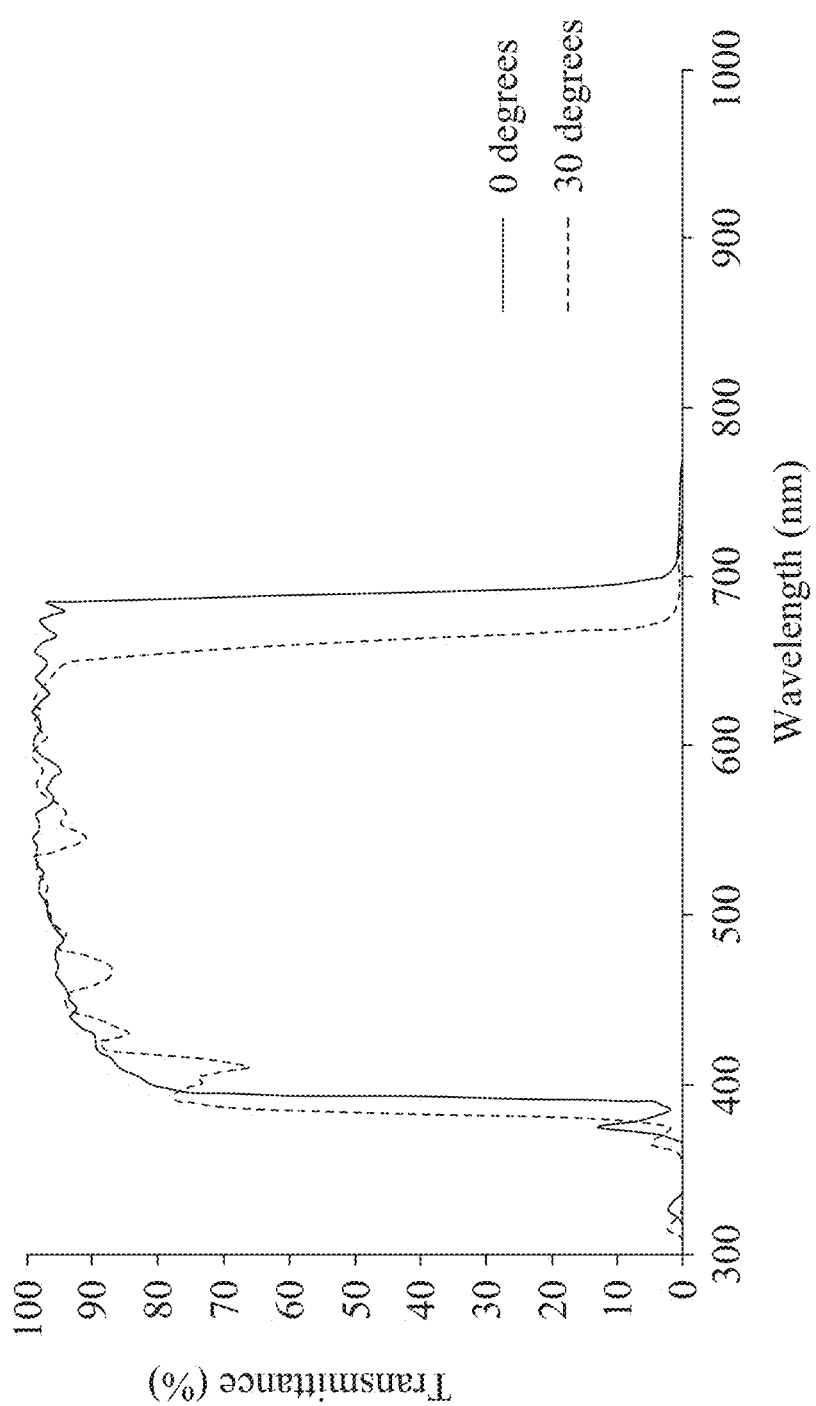
FIG. 1 is a relationship diagram of transmittance and wavelength of the optical lens element according to the 3rd embodiment.

According to an aspect of the present disclosure, an optical lens assembly includes at least three optical lens elements. At least one of the optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the optical lens elements includes a long-wavelength absorbing material, and the optical lens element including the long-wavelength absorbing material is made of a plastic material.

When a maximum of an incident angle of a chief ray in all fields on the surface of the optical lens element including the infrared filtering coating is AICmax, an average transmittance between a wavelength of 500 nm-600 nm of the optical lens assembly is T5060, and an average transmittance between a wavelength of 700 nm-1000 nm of the optical lens assembly is T70100, the following conditions are satisfied: AICmax≤40 degrees; 80%≤T5060; and T70100≤10%.

According to the present disclosure, with the best design of controlling the incident angles within the all fields at the surface of the optical lens element, specific wavelength filtering coating is arranged on the best surface of the optical lens element and the long-wavelength absorbing material is added into the best optical lens element, it is favorable for solving the light-leakage problem of the conventional optical lens element with the infrared filtering coating. Moreover, the blue glass element is directly cut off, which helps the miniaturization of the optical lens assembly. It not only reduces the manufacturing cost of the optical lens assembly, but also prevents the problems such as broken or damage of the glass element.

According to the optical lens assembly of the present disclosure, the coating technique is applied to the optical lens element and the optical element, respectively. By the combination of arranging the infrared filtering coating on the optical lens element and arranging the anti-reflective coating on the optical element, it not only prevents the infrared disturbing the imaging, but also reduces the internal reflection of the optical lens assembly to diminish the petal flare.

When the maximum of the incident angle of the chief ray in the all fields on the surface of the optical lens element including the infrared filtering coating is AICmax, the following condition is satisfied: AICmax≤40 degrees. Moreover, the following conditions can be satisfied: AICmax≤45 degrees; AICmax≤35 degrees; AICmax≤30 degrees; AICmax≤25 degrees; AICmax≤20 degrees; or AICmax≤15 degrees.

When the average transmittance between the wavelength of 500 nm-600 nm of the optical lens assembly is T5060, the following condition is satisfied: 80%≤T5060. Moreover, the following conditions can be satisfied: 75%≤T5060; 85%≤T5060; or 90%≤T5060<100%. Therefore, the high transmittance can make the optical lens assembly have great imaging quality.

When the average transmittance between the wavelength of 700 nm-1000 nm of the optical lens assembly is T70100, the following condition is satisfied: T70100≤10%. Moreover, the following conditions can be satisfied: T70100≤5%; T70100≤4%; T70100≤3%; T70100≤2%; or 0%<T70100≤1%. Therefore, it can avoid the near-infrared disturbing the imaging and reducing the imaging quality.

When a major coating arranging factor of each of surfaces of the optical lens elements is FC, a first coating arranging factor of each of the surfaces of the optical lens elements is Fc1, a second coating arranging factor of each of the surfaces of the optical lens elements is Fc2, and FC=LOG(Fc1×Fc2), at least one of the surfaces of the optical lens element including the infrared filtering coating can satisfy the following condition: 0.96≤FC. Therefore, it is able to decide which surface of the optical lens elements is most suitable for the technique of arranging the coating. The best manufacturing result of the infrared filtering coating can be obtained. The proper filtering effect can be achieved and the strong light reflection can be reduced under the condition of most uniform coating on the surface of the optical lens element, which can effectively improve the imaging quality of the entire optical lens element. Moreover, the following conditions can be satisfied: 0.3≤FC; 0.5≤FC; 0.7≤FC; 1≤FC≤100; 2≤FC≤1000; or 3≤FC≤∞.

When the first coating arranging factor of each of the surfaces of the optical lens elements is Fc1, a central thickness of each of the optical lens elements is CT, a maximum of horizontal displacements between intersections of each of the surfaces of the optical lens elements and an optical axis is SAGmax, and Fc1=CT/|SAGmax|, at least one of the surfaces of the optical lens element including the infrared filtering coating can satisfy the following condition: 1.82≤Fc1. Therefore, by controlling the thickness of the optical lens elements and the change of the horizontal displacements on the surfaces of the optical lens elements, the best arranging result of the infrared filtering coating can be obtained, and the filtering effect can be effectively achieved and the severe strong light reflection can be reduced. Moreover, the following conditions can be satisfied: 2≤Fc1; 2.5≤Fc1; 5≤Fc1; 10≤Fc1; 15≤Fc1≤1000; or 20≤Fc1<∞.

When the second coating arranging factor of each of the surfaces of the optical lens elements is Fc2, an average of tangent slopes in an optical effective diameter region of each of the surfaces of the optical lens elements is SPavg, a minimum of the tangent slopes in the optical effective diameter region of each of the surfaces of the optical lens elements is SPmin, and Fc2=|SPavg|×|SPmin|, at least one of the surfaces of the optical lens element including the infrared filtering coating can satisfy the following condition: 4.98≤Fc2. Therefore, by controlling the slight change of the surface shape of the optical lens elements, it is favorable for solving the defect of stray light caused by severe strong light reflection. Moreover, the following conditions can be satisfied: 1≤Fc2; 5≤Fc2; 10≤Fc2; 20≤5 Fc2; 25≤5 Fc2≤10000; or 45≤Fc2<∞.

The surface of the optical lens element including the infrared filtering coating can be without inflection point or critical point in an off-axis region thereof. Therefore, the degree of the surface shape changing can be reduced because of the design without inflection point or critical point in the off-axis region of the surface of the optical lens element, so as to obtain a uniform filtering effect.

When a total number of coating layers of the infrared filtering coating is tLs, the following condition can be satisfied: 40<tLs≤80. Therefore, by controlling the total number of the coating layers of the infrared filtering coating at a best number, a balance between the filtering effect and the cost can be achieved, and light can be further filtered with high efficiency. Moreover, the following conditions can be satisfied: 30≤tLs≤90; 35≤tLs≤80; 38≤tLs≤70; 40≤tLs≤65; or 42≤tLs≤50.

When a total thickness of coating layers of the infrared filtering coating is tTk, the following condition can be satisfied: 4000 nm<tTk≤10000 nm. Therefore, the required filtering and transparent effects can be obtained, noise can be reduced and the imaging quality can be enhanced due to the proper coating thickness. The integrity of the infrared filtering coating can be effectively maintained, and the deformation of the optical lens element can be prevented. Moreover, the following conditions can be satisfied: 4500 nm≤tTk≤10000 nm; 4700 nm≤tTk≤9000 nm; 5100 nm≤tTk≤8000 nm; 5200 nm≤tTk≤7000 nm; or 5500 nm≤tTk≤6000 nm.

The optical lens element including the infrared filtering coating can be a correcting lens element. Therefore, the temperature effect when coating the surface of the plastic optical lens element can be effectively solved, which is favorable for maintaining the coating integrity of the optical lens element and the high precision of the plastic optical lens element, so as to obtain an imaging lens assembly with high quality.

When the field of view of the optical lens assembly is FOV, the following condition can be satisfied: 60 degrees≤FOV≤200 degrees. Therefore, with the design of the large field of view, it is favorable for expanding the image capturing region, which makes the optical lens element suitable for the main photographing lens assembly of various high-end mobile devices. Moreover, the following conditions can be satisfied: 40 degrees≤FOV≤220 degrees; 70 degrees≤FOV≤180 degrees; 80 degrees≤FOV≤150 degrees; 75 degrees≤FOV≤120 degrees; or 80 degrees≤FOV≤100 degrees.

When a major absorbing material arranging factor of each of the optical lens elements is FA, an average of a track length ratio of a chief ray in the all fields of each of the optical lens elements is CPavg, a standard deviation of the track length ratio of the chief ray in the all fields of each of the optical lens elements is CPst, and FA=LOG (1/(|(CPavg−1)×CPst|)), the optical lens element including the long-wavelength absorbing material can satisfy the following condition: 2.31≤FA. Therefore, by making the best track length design in the optical lens element and adding the long-wavelength absorbing material and/or a short-wavelength absorbing material, the absorbing materials can be effectively mixed in the optical lens element, which makes the optical lens element have a uniform absorption effect. It is favorable for completely solving the problem of shifting light-leakage of the light with large incident angle under the all fields. Moreover, the following conditions can be satisfied: 0.5≤FA; 1.0≤FA; 1.5≤FA; 1.7≤FA; 2.0≤FA≤10; or 2.5≤FA<∞.

When the average of the track length ratio of the chief ray in the all fields of each of the optical lens elements is CPavg, the optical lens element including the long-wavelength absorbing material can satisfy the following condition: 0.9≤CPavg≤1.1. Therefore, the optical lens element can have the best track length design, which can effectively maintain the uniform absorption effect under the all fields. Moreover, the following conditions can be satisfied: 0.95≤CPavg≤1.05, or 0.96≤CPavg≤1.04.

A wavelength of 50% transmittance of the long-wavelength absorbing material can be shorter than a wavelength of 50% transmittance of the infrared filtering coating, and a difference between the wavelength of 50% transmittance of the long-wavelength absorbing material and the wavelength of 50% transmittance of the infrared filtering coating can be more than 20 nm. Therefore, by the best configuration of the long-wavelength absorbing material and/or the short-wavelength absorbing material and the infrared filtering coating, the problem of light-leakage from the light with large incident angle can be completely overcome.

The optical lens element including the long-wavelength absorbing material can be closer to an object side of the optical lens assembly than the surface of the optical lens element including the infrared filtering coating. Therefore, with the design of the optical lens element including the long-wavelength absorbing material and/or the short-wavelength absorbing material being closer to the object side, the optical lens element including the absorbing material will first absorb the light with the wavelength to be filtered.

When the light of the other wavelength reaches the infrared filtering coating, the intensity of reflected light on the surface of large-angle of the optical lens element can be reduced, so as to overcome the light-leakage and improve the image quality.

When a wavelength of 50% transmittance of the optical lens assembly in a long wavelength region where wavelength and transmittance are negatively correlated is LWdT5, the following condition can be satisfied: 600 nm≤LWdT5≤700 nm. Therefore, the wavelength range of the light which is needed to penetrate can be controlled, so as to avoid the near-infrared disturbing the imaging. The overall image quality is improved by arranging the best transmittance of the optical lens element. Moreover, the following conditions can be satisfied: 610 nm≤LWdT5≤660 nm; 620 nm≤LWdT5≤650 nm; 625 nm≤LWdT5≤645 nm; or 630 nm≤LWdT5≤640 nm.

At least one of the optical lens elements can include the short-wavelength absorbing material. Therefore, by eliminating the short-wavelength light with high energy, the durability of the optical lens elements can be extended, and image defects such as purple fringing can be further reduced.

When a wavelength of 50% transmittance of the optical lens assembly in a short wavelength region where wavelength and transmittance are positively correlated is SWuT5, the following conditions can be satisfied: 370 nm≤SWuT5≤450 nm; 380 nm≤SWuT5≤440 nm; 390 nm≤SWuT5≤430 nm; 400 nm≤SWuT5≤430 nm; or 415 nm≤SWuT5≤430 nm. Therefore, the wavelength range of the light which is needed to penetrate can be controlled, and the optical lens assembly can have great image quality and durability.

When an average transmittance between a wavelength of 350 nm-400 nm of the optical lens assembly is T3540, the following conditions can be satisfied: T3540≤30%; T3540≤25%; T3540≤20%; T3540≤15%; or 0%<T3540≤10%. Therefore, the optical lens assembly can have great durability.

When an average transmittance between a wavelength of 400 nm-500 nm of the optical lens assembly is T4050, the following conditions can be satisfied: 50%≤T4050≤90%; 60%≤T4050≤85%; or 65%≤T4050≤80%. Therefore, the optical lens assembly can have great image quality and durability because of better transmittance.

When an average transmittance between a wavelength of 650 nm-700 nm of the optical lens assembly is T6570, the following conditions can be satisfied: T6570≤80%; T6570≤50%; T6570≤30%; 5%≤T6570≤25%; or 0%<T6570≤20%. Therefore, the disturbing by the long-wavelength red light can be reduced and great image quality can be obtained.

When a transmittance at a wavelength of 350 nm of the optical lens assembly is T35, the following conditions can be satisfied: T35≤5%; T35≤4%; T35≤3%; T35≤2%; or 0%<T35≤1%.

When a transmittance at a wavelength of 400 nm of the optical lens assembly is T40, the following conditions can be satisfied: 0%<T40≤60%; 10%≤T40≤50%; 10%≤T40≤40%; or 20%≤T40≤30%.

When a transmittance at a wavelength of 550 nm of the optical lens assembly is T55, the following conditions can be satisfied: 75%≤T55; 80%≤T55; 85%≤T55; or 90%≤T55<100%.

When a transmittance at a wavelength of 600 nm of the optical lens assembly is T60, the following conditions can be satisfied: 70%≤T60; 75%≤T60; 77%≤T60; or 80%≤T60<100%.

When a transmittance at a wavelength of 630 nm of the optical lens assembly is T63, the following conditions can be satisfied: 20%≤T63≤80%; 30%≤T63≤70%; 40%≤T63≤70%; or 50%≤T63≤60%.

When a transmittance at a wavelength of 640 nm of the optical lens assembly is T64, the following conditions can be satisfied: 20%≤T64≤80%; 30%≤T64≤70%; 40%≤T64≤60%; or 40%≤T64≤50%.

When a transmittance at a wavelength of 650 nm of the optical lens assembly is T65, the following conditions can be satisfied: 20%≤T65≤70%; 25%≤T65≤60%; 30%≤T65≤50%; or 35%≤T65≤45%.

When a transmittance at a wavelength of 700 nm of the optical lens assembly is T70, the following conditions can be satisfied: T70≤5%; T70≤4%; T70≤3%; T70≤2%; or 0%<T70≤1%.

When a transmittance at a wavelength of 850 nm of the optical lens assembly is T85, the following conditions can be satisfied: T85≤5%; T85≤4%; T85≤3%; T85≤2%; or 0%<T85≤1%.

According to the present disclosure, the infrared filtering coating on the surface of the plastic optical lens element includes interference-type high refractive index coating layers and low refractive index coating layers arranged in alternations. The high refractive index material used in the infrared filtering coating has a refractive index greater than 2.0, which is preferably $TiO_2$ (NH=2.6142). The low refractive index material used in the infrared filtering coating has a refractive index smaller than 1.8, which is preferably $SiO_2$ (NL=1.4585).

The material of a first coating layer adjacent to the surface of the plastic optical lens element can be $TiO_2$, AlN or $Al_2O_3$. The adhesion between the material and the optical lens element can be enhanced to prevent the infrared filtering coating from peeling off. The surface of the optical lens element can be protected and environmental weatherability of the optical lens element can be effectively enhanced.

The coating material (refractive index at the wavelength of 587.6 nm) can be $SiO_2$ (1.4585), $Al_2O_3$ (1.7682), $Nb_2O_5$ (2.3403), $TiO_2$ (2.6142), $ZrO_2$ (2.1588), $HfO_2$ (1.8935), ZnO (1.9269), $Sc_2O_3$ (1.9872), $Ta_2O_5$ (2.1306), $MgF_2$ (1.3777), ZnS (2.2719), $Si_3N_4$ (2.0381), AlN (2.0294) and/or TiN (3.1307).

The filtering by the infrared filtering coating is based on interference (reflective type). A plurality of coating layers is coated on the surface of the plastic optical lens element to form the infrared filtering coating. Physical vapor deposition (PVD) can be adopted, such as evaporative deposition or sputtering deposition, or chemical vapor deposition (CVD) can be adopted, such as ultra-high vacuum chemical vapor deposition, microwave plasma-enhanced chemical vapor deposition, plasma-enhanced chemical vapor deposition or atomic layer deposition.

According to the present disclosure, the optical lens element including the long-wavelength absorbing material (lens with LW absorber) works in an absorption manner. The long-wavelength absorbing material is mixed with the material of the plastic optical lens element and evenly distributed therein. The long-wavelength absorbing material must be able to withstand the high temperature during the injection molding process without pyrolysis, so as to maintain the proper long-wavelength absorbing effect.

According to the present disclosure, the optical lens assembly includes the optical lens element including the long-wavelength absorbing material, which can eliminate the reflected light-leakage. The color uniformity ratio (R/G ratio and B/G ratio) can be maintained, which makes the optical lens assembly have excellent imaging quality.

According to the present disclosure, the long-wavelength absorbing material (LA1, LA2, LA3, LA4, LA5, LA6, LA7) is added into the plastic optical lens element. Each of the aforementioned materials has a specific wavelength range with 50% transmittance, and the materials can be arranged corresponding to the wavelength range with 50% transmittance of the infrared filtering coating, so as to obtain the best filtering effect.

When a wavelength of 50% transmittance of the long-wavelength absorbing material in a long wavelength region where wavelength and transmittance are negatively correlated is LWdT5, the conditions listed in the following Table 1 can be satisfied:

TABLE 1

Long-Wavelength Absorbing Material

| Material | LWdT5 (nm) |
| --- | --- |
| LA1 | 575-585 |
| LA2 | 595-605 |
| LA3 | 625-635 |
| LA4 | 630-640 |
| LA5 | 635-645 |
| LA6 | 665-675 |
| LA7 | 680-690 |

According to the present disclosure, the optical lens element including the short-wavelength absorbing material (lens with SW absorber) works in an absorption manner. The short-wavelength absorbing material is mixed with the material of the plastic optical lens element and evenly distributed therein. The short-wavelength absorbing material must be able to withstand the high temperature during the injection molding process without pyrolysis, so as to maintain the proper short-wavelength absorbing effect.

According to the present disclosure, the optical lens assembly includes the optical lens element including the short-wavelength absorbing material, which can eliminate the reflected light-leakage. The color uniformity ratio (R/G ratio and B/G ratio) can be maintained and the environmental durability of the optical lens element can be improved, which makes the optical lens assembly have excellent imaging quality.

According to the present disclosure, the short-wavelength absorbing material (SA1, SA2, SA3, SA4, SA5, SA6, SA7) is added into the plastic optical lens element. Each of the aforementioned materials has a specific wavelength range with 50% transmittance, and the materials can be arranged corresponding to the wavelength range with 50% transmittance of the infrared filtering coating, so as to obtain the best filtering effect.

When a wavelength of 50% transmittance of the short-wavelength absorbing material in a short wavelength region where wavelength and transmittance are positively correlated is SWuT5, the conditions listed in the following Table 2 can be satisfied:

TABLE 2

Short-Wavelength Absorbing Material

| Material | SWuT5 (nm) |
| --- | --- |
| SA1 | 340-350 |
| SA2 | 390-400 |

TABLE 2-continued

Short-Wavelength Absorbing Material

| Material | SWuT5 (nm) |
| --- | --- |
| SA3 | 420-430 |
| SA4 | 430-440 |
| SA5 | 430-440 |
| SA6 | 440-450 |
| SA7 | 440-450 |

The all fields of the present disclosure are from the central field (0 Field) to the field of maximum image height (1.0 Field). The all fields cover the optical effective region on the surface of the optical lens element.

The method of calculating the average and standard deviation of the track length ratio of the chief ray in the all fields in the present disclosure is as follows. The field from the center (0F) to the maximum image height (1.0F) is divided by 0.02, which means there is data of 51 fields. The ratio between the track length of the chief ray passing the optical lens element and the central thickness of the optical lens element in every field is calculated, and then the average and standard deviation of the track length ratio of the chief ray in the aforementioned fields are calculated.

The tangent slopes of the surfaces of the optical lens elements are calculated as the optical axis being horizontal, and the tangent slopes in a paraxial region thereof are infinity (INF, $-\infty$).

The long wavelength region defined in the present disclosure is the region having a wavelength above 500 nm, and the short wavelength region is the region having a wavelength below 500 nm.

LWdT5 and SWuT5 of the present disclosure include the wavelength range with 50% transmittance.

The transmittance of the present disclosure can be the data measured from a single optical lens element, or the data measured from the optical lens assembly made up of the optical lens elements. If the optical lens element including the absorbing material and the optical lens element including the infrared filtering coating are different optical lens elements, the transmittance will be the data measured from the optical lens assembly.

According to the present disclosure, the transmittance of the light with the incident angle of 0 degrees is chosen to be the basis for the comparison of transmittance.

Thickness and high temperature will make the error of the surface shape change of the plastic optical lens elements become too large. When the number of coating layers of the infrared filtering coating increases, the effect of temperature on the surface shape accuracy is more obvious. The lens correcting technology can effectively solve the temperature effect problem as coating the surface of the plastic optical lens elements, which is favorable for maintaining the integrity of the coating on the optical lens elements and the high precision of the plastic optical lens elements, so as to obtain an imaging lens assembly with high quality.

The lens correcting technology uses methods such as moldflow analysis method, curve fitting function method or wavefront aberration method, which is not limited thereto. The moldflow analysis method uses moldflow analysis to find out the three-dimensional contour nodes of the surface of the optical lens element which contracts on the Z axis. The three-dimensional contour nodes are converted into an aspherical curve to be compared with the original curve. At the same time, the correction value is calculated by considering the shrinkage rate of the material and the deformation trend of surface shape. The curve fitting function method is to measure the contour deviation of the surface of the element, and the fitting curve approaches to the measuring point to obtain the correction value by curve-fitting with a function and then by an optimization algorithm. The function can be exponential or polynomial, and the optimization algorithm can be Gauss Newton algorithm, simplex algorithm or steepest descent method. The wavefront aberration method is to measure the wavefront aberration (imaging aberration) data of the optical lens assembly with an interferometer. The wavefront aberration generated during manufacturing and assembling is comprehensively analyzed with the wavefront aberration of the original design value, and the correction value is obtained after optimized with optical software.

According to the present disclosure, the infrared filtering coating on the surface of the plastic optical lens element includes interference-type high refractive index coating layers and low refractive index coating layers arranged in alternations. The infrared filtering coating is arranged on the surface of the optical lens element with the best major coating arranging factor (FC), which makes the optical lens element has excellent coating uniformity, low reflection of stray light and uniform filtering effect.

According to the present disclosure, the most suitable optical lens element for adding the absorbing material is decided by the major absorbing material arranging factor (FA), which helps the absorbing material to be evenly mixed in the optical lens element. The optical lens element including the absorbing material has highly uniform absorbing effect of specific wavelength in the all fields.

The optical lens assembly of the present disclosure should be arranged with the configuration of the infrared filtering coating, the long-wavelength absorbing material and the short-wavelength absorbing material, and the optical lens elements are evaluated with the parameters of multiple factors. The best design is made based on the bifactor co-evaluation of the coating evaluation (by FC) and the absorbing evaluation (by FA).

According to one another aspect of the present disclosure, an imaging apparatus includes the aforementioned optical lens assembly and an image sensor disposed on an image surface of the optical lens assembly.

The optical lens assembly according to the present disclosure can further include an image sensor and a cover glass. The image sensor is disposed on the image surface of the optical lens assembly, and the cover glass is disposed on a surface of the image sensor.

When the angle of light is too large, it will cause the light to fail to enter the image sensor, or cause the pixel misalignment response, which leads to color shift and image quality reduction. According to the present disclosure, the cover glass is disposed on the surface of the image sensor. The incident angle decreases after the light being refracted by the cover glass, so the light can be incident into the image sensor. Therefore, the application range of the optical system with large chief ray angle can be improved, and the effects of reducing the chief ray angle, the back focal length, the total length of the optical lens assembly and the maximum image height and simplifying the manufacturing process can be achieved.

When an angle of a chief ray in the field of maximum image height of the optical lens assembly incident into a surface of the cover glass is CRAg, the following condition can be satisfied: 40 degrees≤CRAg. Therefore, the design of the present disclosure is especially suitable for the optical system with large chief ray angle, whose CRAg angle is over 40 degrees, and the application limit to the chief ray angle design of the optical system can be overcome.

An object-side surface of the cover glass can include a long-wavelength absorbing material. Therefore, the absorbing effect can be improved by the cover glass including the long-wavelength absorbing material on the surface thereof, which is suitable for the optical system with large chief ray angle.

At least one surface of the cover glass can include an anti-reflective coating, and the anti-reflective coating can include a subwavelength structure.

Therefore, an anti-reflective effect on a wide field of wavelength can be generated by the anti-reflective coating including the subwavelength structure, which prevents the light-leakage problem from the light with large angle.

An image-side surface of the cover glass can include a long-wavelength absorbing material. Therefore, the number of elements and the complexity of the manufacturing process can be reduced.

According to the present disclosure, a transmittance at a wavelength of 1050 nm of the optical lens element including the long-wavelength absorbing material of the optical lens assembly can be smaller than a transmittance at a wavelength of 500 nm thereof, and the optical lens assembly can further include an image sensor disposed on the image surface of the optical lens assembly.

According to the present disclosure, the light-leakage problem from the near-infrared is fully eliminated by the design of the optical lens element including the long-wavelength absorbing material, which can effectively avoid color shifting and improve overall imaging quality.

According to still another aspect of the present disclosure, an optical lens assembly includes at least one optical lens element and at least one optical element. At least one of the optical lens element includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. The optical element is disposed at an image side of the optical lens element, and at least one of the optical element includes a long-wavelength absorbing material. When a maximum of an incident angle of a chief ray in all fields on the surface of the optical lens element including the infrared filtering coating is AICmax, an average transmittance between a wavelength of 500 nm-600 nm of the optical lens assembly is T5060, and an average transmittance between a wavelength of 700 nm-1000 nm of the optical lens assembly is T70100, the following conditions are satisfied: AICmax≤40 degrees; 80%≤T5060; and T70100≤10%.

According to the present disclosure, the optical element includes the long-wavelength absorbing material, which reduces the number of elements, enhances the long-wavelength filtering effect and reduces the complexity of the manufacturing process.

The optical element including the long-wavelength absorbing material can be a micro lens, and a surface of the micro lens can include the long-wavelength absorbing material.

The optical element including the long-wavelength absorbing material can be a color filter, and the color filter can include the long-wavelength absorbing material.

At least one of the optical lens element can include a long-wavelength absorbing material.

The optical element including the long-wavelength absorbing material can be a cover glass, and at least one surface of the cover glass can include the long-wavelength absorbing material.

According to still another aspect of the present disclosure, an electronic device, which is a mobile device, includes the aforementioned optical lens assembly or imaging apparatus. The electronic device according to the present disclosure can also be a vehicle device, an aviation device or a surveillance device, etc., which is not limited thereto.

According to the above description of the present disclosure, the following specific embodiments are provided for further explanation.

1st Embodiment

The optical lens assembly according to the 1st embodiment includes five optical lens elements, which are, from an object side to an image side, the optical lens element L1, the optical lens element L2, the optical lens element L3, the optical lens element L4 and the optical lens element L5. At least one of the five optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the five optical lens elements includes a long-wavelength absorbing material, and the optical lens element including the long-wavelength absorbing material is made of a plastic material. When a field of view of the optical lens assembly of the 1st embodiment is FOV, the following condition is satisfied: FOV=80 degrees.

An object-side surface of the optical lens element L1 is R1. When a maximum of an incident angle of a chief ray in all fields on the object-side surface R1 of the optical lens element L1 is AICmax, the following condition is satisfied: AICmax=31.09 degrees. An image-side surface of the optical lens element L1 is R2. When a maximum of an incident angle of a chief ray in all fields on the image-side surface R2 of the optical lens element L1 is AICmax, the following condition is satisfied: AICmax=28.30 degrees.

When a first coating arranging factor of the object-side surface R1 of the optical lens element L1 is Fc1, the following condition is satisfied: Fc1=1.82. When a second coating arranging factor of the object-side surface R1 of the optical lens element L1 is Fc2, the following condition is satisfied: Fc2=4.98. When a major coating arranging factor of the object-side surface R1 of the optical lens element L1 is FC, the following condition is satisfied: FC=0.96.

When a first coating arranging factor of the image-side surface R2 of the optical lens element L1 is Fc1, the following condition is satisfied: Fc1=41.66. When a second coating arranging factor of the image-side surface R2 of the optical lens element L1 is Fc2, the following condition is satisfied: Fc2=309.60. When a major coating arranging factor of the image-side surface R2 of the optical lens element L1 is FC, the following condition is satisfied: FC=4.11.

When an average of a track length ratio of a chief ray in all fields of the optical lens element L1 is CPavg, the following condition is satisfied: CPavg=1.04. When a major absorbing material arranging factor of the optical lens element L1 is FA, the following condition is satisfied: FA=2.92.

An object-side surface of the optical lens element L2 is R1. When a maximum of an incident angle of a chief ray in all fields on the object-side surface R1 of the optical lens element L2 is AICmax, the following condition is satisfied: AICmax=45.11 degrees. An image-side surface of the optical lens element L2 is R2. When a maximum of an incident angle of a chief ray in all fields on the image-side surface R2 of the optical lens element L2 is AICmax, the following condition is satisfied: AICmax=28.20 degrees.

When a first coating arranging factor of the object-side surface R1 of the optical lens element L2 is Fc1, the following condition is satisfied: Fc1=8.48. When a second coating arranging factor of the object-side surface R1 of the optical lens element L2 is Fc2, the following condition is satisfied: Fc2=95.24. When a major coating arranging factor of the object-side surface R1 of the optical lens element L2 is FC, the following condition is satisfied: FC=2.91.

When a first coating arranging factor of the image-side surface R2 of the optical lens element L2 is Fc1, the following condition is satisfied: Fc1=4.13. When a second coating arranging factor of the image-side surface R2 of the optical lens element L2 is Fc2, the following condition is satisfied: Fc2=47.62. When a major coating arranging factor of the image-side surface R2 of the optical lens element L2 is FC, the following condition is satisfied: FC=2.29.

When an average of a track length ratio of a chief ray in all fields of the optical lens element L2 is CPavg, the following condition is satisfied: CPavg=1.05. When a major absorbing material arranging factor of the optical lens element L2 is FA, the following condition is satisfied: FA=2.64.

An object-side surface of the optical lens element L3 is R1. When a maximum of an incident angle of a chief ray in all fields on the object-side surface R1 of the optical lens element L3 is AICmax, the following condition is satisfied: AICmax=35.90 degrees. An image-side surface of the optical lens element L3 is R2. When a maximum of an incident angle of a chief ray in all fields on the image-side surface R2 of the optical lens element L3 is AICmax, the following condition is satisfied: AICmax=20.07 degrees.

When a first coating arranging factor of the object-side surface R1 of the optical lens element L3 is Fc1, the following condition is satisfied: Fc1=1.51. When a second coating arranging factor of the object-side surface R1 of the optical lens element L3 is Fc2, the following condition is satisfied: Fc2=6.48. When a major coating arranging factor of the object-side surface R1 of the optical lens element L3 is FC, the following condition is satisfied: FC=0.99.

When a first coating arranging factor of the image-side surface R2 of the optical lens element L3 is Fc1, the following condition is satisfied: Fc1=2.66. When a second coating arranging factor of the image-side surface R2 of the optical lens element L3 is Fc2, the following condition is satisfied: Fc2=33.16. When a major coating arranging factor of the image-side surface R2 of the optical lens element L3 is FC, the following condition is satisfied: FC=1.95.

When an average of a track length ratio of a chief ray in all fields of the optical lens element L3 is CPavg, the following condition is satisfied: CPavg=1.06. When a major absorbing material arranging factor of the optical lens element L3 is FA, the following condition is satisfied: FA=2.60.

An object-side surface of the optical lens element L4 is R1. When a maximum of an incident angle of a chief ray in all fields on the object-side surface R1 of the optical lens element L4 is AICmax, the following condition is satisfied: AICmax=28.55 degrees. An image-side surface of the optical lens element L4 is R2. When a maximum of an incident angle of a chief ray in all fields on the image-side surface R2 of the optical lens element L4 is AICmax, the following condition is satisfied: AICmax=22.46 degrees.

When a first coating arranging factor of the object-side surface R1 of the optical lens element L4 is Fc1, the following condition is satisfied: Fc1=1.92. When a second coating arranging factor of the object-side surface R1 of the optical lens element L4 is Fc2, the following condition is satisfied: Fc2=7.93. When a major coating arranging factor of the object-side surface R1 of the optical lens element L4 is FC, the following condition is satisfied: FC=1.18.

When a first coating arranging factor of the image-side surface R2 of the optical lens element L4 is Fc1, the following condition is satisfied: Fc1=0.98. When a second coating arranging factor of the image-side surface R2 of the optical lens element L4 is Fc2, the following condition is satisfied: Fc2=3.53. When a major coating arranging factor of the image-side surface R2 of the optical lens element L4 is FC, the following condition is satisfied: FC=0.54.

When an average of a track length ratio of a chief ray in all fields of the optical lens element L4 is CPavg, the following condition is satisfied: CPavg=0.78. When a major absorbing material arranging factor of the optical lens element L4 is FA, the following condition is satisfied: FA=1.51.

An object-side surface of the optical lens element L5 is R1. When a maximum of an incident angle of a chief ray in all fields on the object-side surface R1 of the optical lens element L5 is AICmax, the following condition is satisfied: AICmax=48.49 degrees. An image-side surface of the optical lens element L5 is R2. When a maximum of an incident angle of a chief ray in all fields on the image-side surface R2 of the optical lens element L5 is AICmax, the following condition is satisfied: AICmax=20.40 degrees.

When a first coating arranging factor of the object-side surface R1 of the optical lens element L5 is Fc1, the following condition is satisfied: Fc1=0.63. When a second coating arranging factor of the object-side surface R1 of the optical lens element L5 is Fc2, the following condition is satisfied: Fc2=8.03. When a major coating arranging factor of the object-side surface R1 of the optical lens element L5 is FC, the following condition is satisfied: FC=0.70. When a first coating arranging factor of the image-side surface R2 of the optical lens element L5 is Fc1, the following condition is satisfied: Fc1=0.76. When a second coating arranging factor of the image-side surface R2 of the optical lens element L5 is Fc2, the following condition is satisfied: Fc2=4.11. When a major coating arranging factor of the image-side surface R2 of the optical lens element L5 is FC, the following condition is satisfied: FC=0.49.

When an average of a track length ratio of a chief ray in all fields of the optical lens element L5 is CPavg, the following condition is satisfied: CPavg=1.79. When a major absorbing material arranging factor of the optical lens element L5 is FA, the following condition is satisfied: FA=0.38.

The detailed values of parameters of each of the optical lens elements in the optical lens assembly according to the 1st embodiment are shown in Table 3, Table 4 and Table 5 below.

TABLE 3

Incident Angles of Chief Ray of Each Optical Lens Element According to 1st Embodiment

| Field | Surface of Optical Lens Element | | | | | |
|---|---|---|---|---|---|---|
| | L1R1 | L1R2 | L2R1 | L2R2 | L3R1 | L3R2 |
| 0.00 | 0.00 | 0.00 | 0.00 | 0.00 | 0.00 | 0.00 |
| 0.05 | 1.95 | 1.74 | 2.57 | 1.68 | 2.66 | 1.70 |
| 0.10 | 3.90 | 3.47 | 5.12 | 3.34 | 5.31 | 3.38 |
| 0.15 | 5.82 | 5.18 | 7.66 | 5.00 | 7.92 | 5.04 |
| 0.20 | 7.72 | 6.87 | 10.18 | 6.63 | 10.49 | 6.65 |
| 0.25 | 9.57 | 8.52 | 12.66 | 8.24 | 13.00 | 8.21 |
| 0.30 | 11.38 | 10.14 | 15.10 | 9.81 | 15.43 | 9.70 |
| 0.35 | 13.15 | 11.73 | 17.50 | 11.36 | 17.79 | 11.11 |
| 0.40 | 14.86 | 13.26 | 19.86 | 12.86 | 20.04 | 12.42 |
| 0.45 | 16.51 | 14.75 | 22.17 | 14.33 | 22.19 | 13.63 |
| 0.50 | 18.11 | 16.20 | 24.43 | 15.76 | 24.22 | 14.72 |
| 0.55 | 19.65 | 17.60 | 26.65 | 17.15 | 26.13 | 15.68 |
| 0.60 | 21.14 | 18.96 | 28.84 | 18.51 | 27.91 | 16.51 |
| 0.65 | 22.57 | 20.27 | 30.98 | 19.83 | 29.54 | 17.20 |
| 0.70 | 23.95 | 21.54 | 33.09 | 21.12 | 31.01 | 17.75 |
| 0.75 | 25.28 | 22.77 | 35.17 | 22.37 | 32.31 | 18.16 |
| 0.80 | 26.55 | 23.97 | 37.23 | 23.60 | 33.44 | 18.47 |
| 0.85 | 27.78 | 25.12 | 39.25 | 24.80 | 34.36 | 18.70 |
| 0.90 | 28.94 | 26.22 | 41.23 | 25.96 | 35.08 | 18.93 |
| 0.95 | 30.04 | 27.28 | 43.18 | 27.09 | 35.59 | 19.31 |
| 1.00 | 31.09 | 28.30 | 45.11 | 28.20 | 35.90 | 20.07 |
| AICmax | 31.09 | 28.30 | 45.11 | 28.20 | 35.90 | 20.07 |

| Field | Surface of Optical Lens Element | | | |
|---|---|---|---|---|
| | L4R1 | L4R2 | L5R1 | L5R2 |
| 0.00 | 0.00 | 0.00 | 0.00 | 0.00 |
| 0.05 | 2.12 | 1.92 | 0.40 | 4.64 |
| 0.10 | 4.26 | 3.61 | 0.79 | 8.91 |
| 0.15 | 6.43 | 4.91 | 1.18 | 12.57 |
| 0.20 | 8.63 | 5.75 | 1.60 | 15.50 |
| 0.25 | 10.87 | 6.13 | 2.10 | 17.71 |
| 0.30 | 13.14 | 6.09 | 2.70 | 19.22 |
| 0.35 | 15.41 | 5.67 | 3.37 | 20.10 |
| 0.40 | 17.66 | 4.92 | 3.99 | 20.40 |
| 0.45 | 19.85 | 3.84 | 4.41 | 20.20 |
| 0.50 | 21.94 | 2.44 | 4.45 | 19.52 |
| 0.55 | 23.87 | 0.73 | 3.95 | 18.39 |
| 0.60 | 25.58 | 1.30 | 2.71 | 16.80 |
| 0.65 | 26.99 | 3.68 | 0.60 | 14.73 |
| 0.70 | 28.01 | 6.40 | 2.56 | 12.15 |
| 0.75 | 28.55 | 9.44 | 6.95 | 9.01 |
| 0.80 | 28.50 | 12.75 | 12.77 | 5.36 |
| 0.85 | 27.80 | 16.15 | 20.15 | 1.61 |
| 0.90 | 26.49 | 19.30 | 28.98 | 1.57 |
| 0.95 | 24.75 | 21.71 | 38.80 | 3.48 |
| 1.00 | 23.02 | 22.46 | 48.49 | 3.37 |
| AICmax | 28.55 | 22.46 | 48.49 | 20.40 |

TABLE 4

Coating Evaluation of Each Optical Lens Element According to 1st Embodiment

| | | FOV (degrees) 80 | | | | |
|---|---|---|---|---|---|---|
| | | L1 | L2 | L3 | L4 | L5 |
| R1 | CT | 0.45 | 0.24 | 0.24 | 0.51 | 0.32 |
| | \|SAGmax\| | 0.25 | 0.03 | 0.16 | 0.26 | 0.51 |
| | Fc1 = CT/\|SAGmax\| | 1.82 | 8.48 | 1.51 | 1.92 | 0.63 |
| | \|SPmin\| | 1.61 | 4.76 | 1.28 | 1.54 | 2.00 |
| | \|SPavg\| | 3.09 | 20.00 | 5.05 | 5.15 | 4.02 |
| | Fc2 = \|SPavg\| × \|SPmin\| | 4.98 | 95.24 | 6.48 | 7.93 | 8.03 |
| | FC = LOG(Fc1 × Fc2) | 0.96 | 2.91 | 0.99 | 1.18 | 0.70 |

TABLE 4-continued

Coating Evaluation of Each Optical Lens Element According to 1st Embodiment

| | | FOV (degrees) 80 | | | | |
|---|---|---|---|---|---|---|
| | | L1 | L2 | L3 | L4 | L5 |
| R2 | \|SAGmax\| | 0.01 | 0.06 | 0.09 | 0.52 | 0.42 |
| | Fc1 = CT/\|SAGmax\| | 41.66 | 4.13 | 2.66 | 0.98 | 0.76 |
| | \|SPmin\| | 5.26 | 3.57 | 3.45 | 1.14 | 1.20 |
| | \|SPavg\| | 58.82 | 13.33 | 9.62 | 3.11 | 3.41 |
| | Fc2 = \|SPavg\| × \|SPmin\| | 309.60 | 47.62 | 33.16 | 3.53 | 4.11 |
| | FC = LOG(Fc1 × Fc2) | 4.11 | 2.29 | 1.95 | 0.54 | 0.49 |

TABLE 5

Absorbing Evaluation of Each Optical Lens Element According to 1st Embodiment

| | L1 | L2 | L3 | L4 | L5 |
|---|---|---|---|---|---|
| CPavg | 1.04 | 1.05 | 1.06 | 0.78 | 1.79 |
| CPst | 0.03 | 0.04 | 0.05 | 0.14 | 0.52 |
| FA = LOG(1/(\|(CPavg − 1) × CPst\|)) | 2.92 | 2.64 | 2.60 | 1.51 | 0.38 |

A central thickness of each of the optical lens elements is CT, a maximum of horizontal displacements between intersections of each of the surfaces of the optical lens elements and an optical axis is SAGmax, an average of tangent slopes in an optical effective diameter region of each of the surfaces of the optical lens elements is SPavg, a minimum of the tangent slopes in the optical effective diameter region of each of the surfaces of the optical lens elements is SPmin, and a standard deviation of the track length ratio of the chief ray in the all fields of each of the optical lens elements is CPst.

2nd Embodiment

The optical lens assembly according to the 2nd embodiment includes six optical lens elements, which are, from an object side to an image side, the optical lens element L1, the optical lens element L2, the optical lens element L3, the optical lens element L4, the optical lens element L5 and the optical lens element L6. At least one of the six optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the six optical lens elements includes a long-wavelength absorbing material, and the optical lens element including the long-wavelength absorbing material is made of a plastic material.

The detailed values of parameters of each of the optical lens elements in the optical lens assembly according to the 2nd embodiment are shown in Table 6, Table 7 and Table 8 below. The definitions of these parameters shown in the following tables are the same as those stated in the 1st embodiment with corresponding values for the 2nd embodiment, so an explanation in this regard will not be provided again.

TABLE 6

Incident Angles of Chief Ray of Each Optical Lens Element According to 2nd Embodiment

| | Surface of Optical Lens Element | | | | | |
|---|---|---|---|---|---|---|
| Field | L1R1 | L1R2 | L2R1 | L2 R2 | L3R1 | L3R2 |
| 0.00 | 0.00 | 0.00 | 0.00 | 0.00 | 0.00 | 0.00 |
| 0.05 | 1.55 | 1.86 | 2.90 | 1.92 | 3.20 | 2.14 |
| 0.10 | 3.10 | 3.71 | 5.80 | 3.83 | 6.39 | 4.26 |
| 0.15 | 4.63 | 5.54 | 8.68 | 5.72 | 9.56 | 6.34 |
| 0.20 | 6.14 | 7.35 | 11.53 | 7.59 | 12.68 | 8.35 |
| 0.25 | 7.61 | 9.13 | 14.35 | 9.43 | 15.76 | 10.27 |
| 0.30 | 9.06 | 10.88 | 17.15 | 11.23 | 18.79 | 12.10 |
| 0.35 | 10.46 | 12.60 | 19.91 | 13.00 | 21.76 | 13.83 |
| 0.40 | 11.82 | 14.26 | 22.63 | 14.73 | 24.66 | 15.43 |
| 0.45 | 13.13 | 15.88 | 25.30 | 16.40 | 27.47 | 16.90 |
| 0.50 | 14.39 | 17.45 | 27.93 | 18.02 | 30.21 | 18.24 |
| 0.55 | 15.60 | 18.97 | 30.52 | 19.60 | 32.86 | 19.43 |
| 0.60 | 16.76 | 20.45 | 33.07 | 21.13 | 35.43 | 20.45 |
| 0.65 | 17.88 | 21.88 | 35.59 | 22.61 | 37.91 | 21.29 |
| 0.70 | 18.94 | 23.26 | 38.08 | 24.05 | 40.28 | 21.88 |
| 0.75 | 19.97 | 24.60 | 40.55 | 25.44 | 42.54 | 22.18 |
| 0.80 | 20.94 | 25.89 | 42.99 | 26.79 | 44.62 | 22.08 |
| 0.85 | 21.86 | 27.12 | 45.39 | 28.09 | 46.49 | 21.43 |
| 0.90 | 22.73 | 28.31 | 47.78 | 29.35 | 48.06 | 20.04 |
| 0.95 | 23.58 | 29.47 | 50.20 | 30.59 | 49.22 | 17.56 |
| 1.00 | 24.43 | 30.66 | 52.76 | 31.88 | 49.69 | 13.40 |
| AICmax | 24.43 | 30.66 | 52.76 | 31.88 | 49.69 | 22.18 |

| | Surface of Optical Lens Element | | | | | |
|---|---|---|---|---|---|---|
| Field | L4R1 | L4R2 | L5R1 | L5R2 | L6R1 | L6R2 |
| 0.00 | 0.00 | 0.00 | 0.00 | 0.00 | 0.00 | 0.00 |
| 0.05 | 3.58 | 2.19 | 3.32 | 1.52 | 0.59 | 4.92 |
| 0.10 | 7.09 | 4.32 | 6.62 | 2.77 | 1.36 | 9.25 |
| 0.15 | 10.48 | 6.33 | 9.86 | 3.61 | 2.51 | 12.63 |
| 0.20 | 13.68 | 8.15 | 12.97 | 4.03 | 4.10 | 14.99 |
| 0.25 | 16.65 | 9.75 | 15.85 | 4.13 | 6.08 | 16.40 |
| 0.30 | 19.36 | 11.08 | 18.39 | 4.02 | 8.22 | 17.03 |
| 0.35 | 21.76 | 12.13 | 20.41 | 3.77 | 10.10 | 17.09 |
| 0.40 | 23.84 | 12.86 | 21.77 | 3.38 | 11.32 | 16.78 |
| 0.45 | 25.57 | 13.29 | 22.34 | 2.78 | 11.51 | 16.16 |
| 0.50 | 26.95 | 13.43 | 22.07 | 1.87 | 10.42 | 15.19 |
| 0.55 | 27.95 | 13.35 | 20.99 | 0.53 | 7.88 | 13.75 |
| 0.60 | 28.57 | 13.13 | 19.25 | 1.28 | 3.82 | 11.81 |
| 0.65 | 28.77 | 12.92 | 17.13 | 3.61 | 1.74 | 9.38 |
| 0.70 | 28.52 | 12.88 | 15.05 | 6.44 | 8.74 | 6.59 |
| 0.75 | 27.74 | 13.19 | 13.52 | 9.69 | 17.09 | 3.76 |
| 0.80 | 26.29 | 14.03 | 13.09 | 13.19 | 26.53 | 1.35 |
| 0.85 | 24.01 | 15.56 | 14.32 | 16.59 | 36.59 | 0.15 |
| 0.90 | 20.63 | 17.90 | 17.98 | 19.29 | 46.61 | 0.20 |
| 0.95 | 15.81 | 21.22 | 25.54 | 20.80 | 56.30 | 2.13 |
| 1.00 | 9.13 | 25.66 | 41.35 | 22.53 | 66.93 | 7.86 |
| AICmax | 28.77 | 25.66 | 41.35 | 22.53 | 66.93 | 17.09 |

TABLE 7

Coating Evaluation of Each Optical Lens Element According to 2nd Embodiment

| | | FOV (degrees) 79 | | | | |
|---|---|---|---|---|---|---|
| | | L1 | L2 | L3 | L4 | L5 |
| R1 | CT | 0.96 | 0.29 | 0.38 | 0.36 | 0.68 |
| | \|SAGmax\| | 0.68 | 0.08 | 0.07 | 0.33 | 0.50 |
| | Fc1 = CT/\|SAGmax\| | 1.42 | 3.48 | 5.33 | 1.06 | 1.37 |
| | \|SPmin\| | 1.09 | 2.56 | 2.00 | 0.85 | 1.72 |
| | \|SPavg\| | 2.22 | 13.33 | 11.90 | 4.41 | 5.08 |
| | Fc2 = \|SPavg\| × \|SPmin\| | 2.42 | 34.19 | 23.81 | 3.77 | 8.75 |
| | FC = LOG(Fc1 × Fc2) | 0.54 | 2.08 | 2.10 | 0.60 | 1.08 |

TABLE 7-continued

Coating Evaluation of Each Optical Lens Element According to 2nd Embodiment

|   |   |   |   |   |   |   |
|---|---|---|---|---|---|---|
| R2 | \|SAGmax\| | 0.05 | 0.20 | 0.20 | 0.30 | 0.89 |
|  | Fc1 = CT/\|SAGmax\| | 18.68 | 1.46 | 1.91 | 1.18 | 0.77 |
|  | \|SPmin\| | 7.69 | 1.25 | 1.27 | 3.03 | 2.33 |
|  | \|SPavg\| | 23.81 | 4.90 | 6.33 | 6.13 | 3.22 |
|  | Fc2 = \|SPavg\| × \|SPmin\| | 183.15 | 6.13 | 8.01 | 18.59 | 7.48 |
|  | FC = LOG(Fc1 × Fc2) | 3.53 | 0.95 | 1.18 | 1.34 | 0.76 |

|   |   | L6 |
|---|---|---|
|  | CT | 0.47 |
| R1 | \|SAGmax\| | 0.77 |
|  | Fc1 = CT/\|SAGmax\| | 0.61 |
|  | \|SPmin\| | 1.82 |
|  | \|SPavg\| | 4.02 |
|  | Fc2 = \|SPavg\| × \|SPmin\| | 7.30 |
|  | FC = LOG(Fc1 × Fc2) | 0.65 |
| R2 | \|SAGmax\| | 0.80 |
|  | Fc1 = CT/\|SAGmax\| | 0.59 |
|  | \|SPmin\| | 1.43 |
|  | \|SPavg\| | 3.53 |
|  | Fc2 = \|sPavg\| × \|SPmin\| | 5.05 |
|  | FC = LOG(Fc1 × Fc2) | 0.47 |

TABLE 8

Absorbing Evaluation of Each Optical Lens Element According to 2nd Embodiment

|  | L1 | L2 | L3 | L4 | L5 | L6 |
|---|---|---|---|---|---|---|
| CPavg | 1.03 | 1.06 | 1.05 | 1.02 | 0.73 | 1.75 |
| CPst | 0.03 | 0.05 | 0.04 | 0.03 | 0.16 | 0.48 |
| FA = LOG(1/(\|(CPavg − 1) × CPst)\|) | 3.09 | 2.47 | 2.70 | 3.17 | 1.36 | 0.44 |

3rd Embodiment

The optical lens assembly according to the 3rd embodiment includes six optical lens elements, which are, from an object side to an image side, the optical lens element L1, the optical lens element L2, the optical lens element L3, the optical lens element L4, the optical lens element L5 and the optical lens element L6. The optical lens element L1 includes an infrared filtering coating, the optical lens element L1 including the infrared filtering coating is made of a plastic material, the infrared filtering coating is arranged on an image-side surface R2 of the optical lens element L1, the surface of the optical lens element L1 including the infrared filtering coating is aspheric, and the infrared filtering coating includes at least two different refractive indices. The optical lens element L1 includes a long-wavelength absorbing material, and the optical lens element L1 including the long-wavelength absorbing material is made of a plastic material.

The detailed values of parameters of each of the optical lens elements in the optical lens assembly according to the 3rd embodiment are shown in Table 9, Table 10 and Table 11 below. The definitions of these parameters shown in the following tables are the same as those stated in the 1st embodiment with corresponding values for the 3rd embodiment, so an explanation in this regard will not be provided again.

TABLE 9

Incident Angles of Chief Ray of Each Optical Lens Element According to 3rd Embodiment

| | Surface of Optical Lens Element | | | | | |
|---|---|---|---|---|---|---|
| Field | L1R1 | L1R2 | L2R1 | L2R2 | L3R1 | L3R2 |
| 0.00 | 0.00 | 0.00 | 0.00 | 0.00 | 0.00 | 0.00 |
| 0.05 | 1.93 | 1.95 | 3.07 | 1.97 | 3.23 | 2.09 |
| 0.10 | 3.85 | 3.89 | 6.13 | 3.93 | 6.43 | 4.14 |
| 0.15 | 5.73 | 5.80 | 9.15 | 5.86 | 9.60 | 6.15 |
| 0.20 | 7.58 | 7.67 | 12.12 | 7.75 | 12.72 | 8.08 |
| 0.25 | 9.38 | 9.50 | 15.06 | 9.60 | 15.78 | 9.93 |
| 0.30 | 11.13 | 11.30 | 17.95 | 11.41 | 18.80 | 11.68 |
| 0.35 | 12.84 | 13.05 | 20.81 | 13.19 | 21.77 | 13.33 |
| 0.40 | 14.51 | 14.77 | 23.64 | 14.92 | 24.70 | 14.87 |
| 0.45 | 16.11 | 16.44 | 26.43 | 16.60 | 27.58 | 16.29 |
| 0.50 | 17.66 | 18.05 | 29.18 | 18.23 | 30.40 | 17.58 |
| 0.55 | 19.14 | 19.61 | 31.86 | 19.80 | 33.15 | 18.72 |
| 0.60 | 20.54 | 21.10 | 34.49 | 21.31 | 35.81 | 19.70 |
| 0.65 | 21.88 | 22.53 | 37.07 | 22.75 | 38.40 | 20.49 |
| 0.70 | 23.16 | 23.90 | 39.61 | 24.14 | 40.90 | 21.06 |
| 0.75 | 24.38 | 25.24 | 42.12 | 25.49 | 43.33 | 21.36 |
| 0.80 | 25.54 | 26.51 | 44.61 | 26.79 | 45.64 | 21.30 |
| 0.85 | 26.63 | 27.73 | 47.04 | 28.02 | 47.79 | 20.80 |
| 0.90 | 27.65 | 28.88 | 49.44 | 29.19 | 49.73 | 19.73 |
| 0.95 | 28.63 | 30.00 | 51.86 | 30.34 | 51.44 | 17.88 |
| 1.00 | 29.61 | 31.12 | 54.38 | 31.50 | 52.79 | 14.94 |
| AICmax | 29.61 | 31.12 | 54.38 | 31.50 | 52.79 | 21.36 |

| | Surface of Optical Lens Element | | | | | |
|---|---|---|---|---|---|---|
| Field | L4R1 | L4R2 | L5R1 | L5R2 | L6R1 | L6R2 |
| 0.00 | 0.00 | 0.00 | 0.00 | 0.00 | 0.00 | 0.00 |
| 0.05 | 4.15 | 2.82 | 3.59 | 1.37 | 0.95 | 4.73 |
| 0.10 | 8.20 | 5.56 | 7.17 | 2.52 | 1.96 | 9.08 |
| 0.15 | 12.08 | 8.15 | 10.72 | 3.32 | 3.14 | 12.74 |
| 0.20 | 15.71 | 10.51 | 14.18 | 3.76 | 4.64 | 15.55 |
| 0.25 | 19.04 | 12.59 | 17.47 | 3.90 | 6.59 | 17.43 |
| 0.30 | 22.04 | 14.35 | 20.48 | 3.83 | 8.96 | 18.39 |
| 0.35 | 24.70 | 15.75 | 23.06 | 3.65 | 11.51 | 18.49 |
| 0.40 | 26.98 | 16.77 | 25.07 | 3.41 | 13.83 | 17.90 |
| 0.45 | 28.88 | 17.40 | 26.34 | 3.09 | 15.48 | 16.84 |
| 0.50 | 30.39 | 17.65 | 26.77 | 2.62 | 16.07 | 15.49 |
| 0.55 | 31.50 | 17.56 | 26.30 | 1.87 | 15.32 | 13.92 |
| 0.60 | 32.21 | 17.18 | 24.96 | 0.67 | 13.04 | 12.09 |
| 0.65 | 32.50 | 16.57 | 22.84 | 1.12 | 9.11 | 9.90 |
| 0.70 | 32.30 | 15.83 | 20.17 | 3.64 | 3.43 | 7.27 |
| 0.75 | 31.51 | 15.11 | 17.38 | 6.96 | 4.12 | 4.24 |
| 0.80 | 30.03 | 14.64 | 15.07 | 11.07 | 13.60 | 1.22 |
| 0.85 | 27.77 | 14.73 | 13.97 | 15.78 | 24.85 | 1.17 |
| 0.90 | 24.67 | 15.72 | 14.88 | 20.65 | 37.50 | 2.39 |
| 0.95 | 20.65 | 18.15 | 19.11 | 24.78 | 50.50 | 1.76 |
| 1.00 | 15.62 | 23.07 | 30.44 | 27.17 | 63.00 | 2.75 |
| AICmax | 32.50 | 23.07 | 30.44 | 27.17 | 63.00 | 18.49 |

TABLE 10

Coating Evaluation of Each Optical Lens Element According to 3rd Embodiment

| | | 84 | | | | |
|---|---|---|---|---|---|---|
| FOV (degrees) | | L1 | L2 | L3 | L4 | L5 |
|  | CT | 0.80 | 0.26 | 0.57 | 0.35 | 0.77 |
| R1 | \|SAGmax\| | 0.57 | 0.09 | 0.09 | 0.29 | 0.45 |
|  | Fc1 = CT/\|SAGmax\| | 1.41 | 2.84 | 6.18 | 1.21 | 1.71 |

TABLE 10-continued

Coating Evaluation of Each Optical Lens Element According to 3rd Embodiment

|   |   | | | | | |
|---|---|---|---|---|---|---|
| | \|SPmin\| | 1.27 | 3.45 | 2.56 | 1.05 | 1.79 |
| | \|SPavg\| | 2.58 | 12.66 | 13.16 | 5.03 | 5.75 |
| | Fc2 = \|SPavg\| × \|SPmin\| | 3.27 | 43.65 | 33.74 | 5.29 | 10.26 |
| | FC = LOG(Fc1 × Fc2) | 0.66 | 2.09 | 2.32 | 0.81 | 1.24 |
| R2 | \|SAGmax\| | 0.07 | 0.24 | 0.26 | 0.22 | 0.91 |
| | Fc1 = CT/\|SAGmax\| | 11.16 | 1.09 | 2.17 | 1.62 | 0.84 |
| | \|SPmin\| | 11.11 | 1.41 | 1.54 | 2.94 | 2.22 |
| | \|SPavg\| | 18.87 | 5.10 | 5.95 | 7.09 | 3.47 |
| | Fc2 = \|SPavg\| × \|SPmin\| | 209.64 | 7.19 | 9.16 | 20.86 | 7.72 |
| | FC = LOG(Fc1 × Fc2) | 3.37 | 0.90 | 1.30 | 1.53 | 0.81 |

| | | L6 |
|---|---|---|
| CT | | 0.54 |
| R1 | \|SAGmax\| | 1.09 |
| | Fc1 = CT/\|SAGmax\| | 0.50 |
| | \|SPmin\| | 1.41 |
| | \|SPavg\| | 3.18 |
| | Fc2 = \|SPavg\| × \|SPmin\| | 4.49 |
| | FC = LOG(Fc1 × Fc2) | 0.35 |
| R2 | \|SAGmax\| | 0.95 |
| | Fc1 = CT/\|SAGmax\| | 0.57 |
| | \|SPmin\| | 1.22 |
| | \|SPavg\| | 3.34 |
| | Fc2 = \|SPavg\| × \|SPmin\| | 4.08 |
| | FC = LOG(Fc1 × Fc2) | 0.37 |

TABLE 11

Absorbing Evaluation of Each Optical Lens Element According to 3rd Embodiment

| | L1 | L2 | L3 | L4 | L5 | L6 |
|---|---|---|---|---|---|---|
| CPavg | 1.04 | 1.06 | 1.04 | 1.06 | 0.70 | 1.89 |
| CPst | 0.03 | 0.05 | 0.03 | 0.04 | 0.19 | 0.57 |
| FA = LOG(1/(\|(CPavg − 1) × CPst\|)) | 2.95 | 2.48 | 2.87 | 2.66 | 1.23 | 0.29 |

Please refer to FIG. 1 and Table 12 below. FIG. 1 is a relationship diagram of transmittance and wavelength of the optical lens element L1 according to the 3rd embodiment, wherein the light which is incident into the optical lens element L1 has the incident angles of 0 degrees and 30 degrees, respectively. The transmittance of light with different wavelength is shown in Table 12. When a wavelength of 50% transmittance of the optical lens element L1 in a long wavelength region where wavelength and transmittance are negatively correlated is LWdT5, the following condition is satisfied: 600 nm≤LWdT5≤700 nm. When a wavelength of 50% transmittance of the optical lens element L1 in a short wavelength region where wavelength and transmittance are positively correlated is SWuT5, the following condition is satisfied: 370 nm≤SWuT5≤450 nm.

TABLE 12

Transmittance of Optical Lens Element L1 According to 3rd Embodiment

| T (%) | 0 degrees | T (%) | 30 degrees |
|---|---|---|---|
| LWdT5 (nm) | 685-690 | LWdT5 (nm) | 660-665 |
| SWuT5 (nm) | 390-395 | SWuT5 (nm) | 380-385 |
| T3540 (%) | 16.65 | T3540 (%) | 28.75 |
| T4050 (%) | 91.91 | T4050 (%) | 87.43 |
| T5060 (%) | 97.54 | T5060 (%) | 96.62 |
| T6570 (%) | 76.10 | T6570 (%) | 24.57 |
| T70100 (%) | 0.18 | T70100 (%) | 0.10 |
| T35 (%) | 0.00 | T35 (%) | 0.01 |
| T40 (%) | 81.17 | T40 (%) | 73.53 |
| T55 (%) | 98.34 | T55 (%) | 92.99 |
| T60 (%) | 98.99 | T60 (%) | 98.21 |
| T63 (%) | 96.79 | T63 (%) | 98.96 |
| T64 (%) | 98.64 | T64 (%) | 96.38 |
| T65 (%) | 97.09 | T65 (%) | 94.30 |
| T70 (%) | 3.02 | T70 (%) | 0.62 |
| T85 (%) | 0.00 | T85 (%) | 0.00 |

Figure 2:
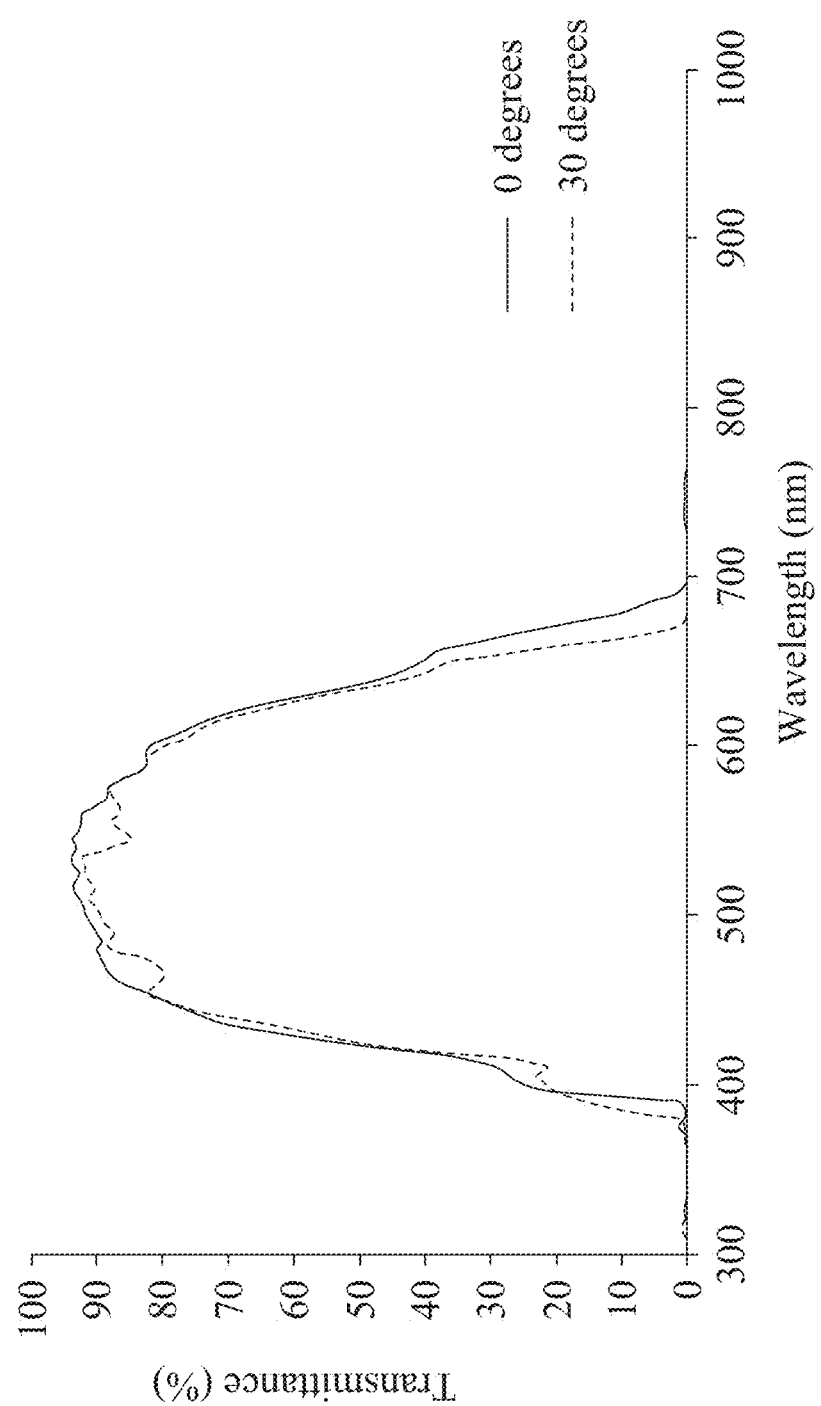
FIG. 2 is a relationship diagram of transmittance and wavelength of the optical lens assembly according to the 3rd embodiment.

Please refer to FIG. 2 and Table 13 below. FIG. 2 is a relationship diagram of transmittance and wavelength of the optical lens assembly according to the 3rd embodiment, wherein the light which is incident into the optical lens assembly has the incident angles of 0 degrees and 30 degrees, respectively. The transmittance of light with different wavelength is shown in Table 13. When a wavelength of 50% transmittance of the optical lens assembly in a long wavelength region where wavelength and transmittance are negatively correlated is LWdT5, the following condition is satisfied: 600 nm≤LWdT5≤700 nm. When a wavelength of 50% transmittance of the optical lens assembly in a short wavelength region where wavelength and transmittance are positively correlated is SWuT5, the following condition is satisfied: 370 nm≤SWuT5≤450 nm.

TABLE 13

Transmittance of Optical Lens Assembly According to 3rd Embodiment

| T (%) | 0 degrees | T (%) | 30 degrees |
|---|---|---|---|
| LWdT5 (nm) | 635-640 | LWdT5 (nm) | 630-635 |
| SWuT5 (nm) | 420-425 | SWuT5 (nm) | 420-425 |
| T3540 (%) | 4.39 | T3540 (%) | 6.31 |
| T4050 (%) | 69.66 | T4050 (%) | 65.85 |
| T5060 (%) | 90.31 | T5060 (%) | 87.87 |
| T6570 (%) | 17.74 | T6570 (%) | 8.26 |
| T70100 (%) | 0.06 | T70100 (%) | 0.04 |
| T35 (%) | 0.00 | T35 (%) | 0.00 |
| T40 (%) | 24.85 | T40 (%) | 21.34 |
| T55 (%) | 93.04 | T55 (%) | 86.63 |
| T60 (%) | 82.07 | T60 (%) | 79.52 |
| T63 (%) | 57.65 | T63 (%) | 55.97 |
| T64 (%) | 46.65 | T64 (%) | 42.59 |
| T65 (%) | 40.64 | T65 (%) | 36.50 |
| T70 (%) | 0.10 | T70 (%) | 0.01 |
| T85 (%) | 0.00 | T85 (%) | 0.00 |

The coating design of the optical lens element L1 according to the 3rd embodiment is shown in Table 14 below. When a total number of coating layers of the infrared filtering coating is tLs, the following condition is satisfied: 40<tLs≤80. When a total thickness of coating layers of the infrared filtering coating is tTk, the following condition is satisfied: 4000 nm<tTk≤10000 nm.

TABLE 14

Coating Design According to 3rd Embodiment

| tLs | 46 |
|---|---|
| tTk (nm) | 5527 |
| Refractive Index of Material | Thickness (nm) |
| High | 12 |
| Low | 36 |
| High | 113 |
| Low | 173 |
| High | 109 |
| Low | 174 |
| High | 104 |
| Low | 158 |
| High | 96 |
| Low | 168 |
| High | 108 |
| Low | 178 |
| High | 107 |
| Low | 163 |
| High | 91 |
| Low | 161 |
| High | 106 |
| Low | 178 |
| High | 109 |
| Low | 166 |
| High | 91 |
| Low | 155 |
| High | 104 |
| Low | 176 |
| High | 109 |
| Low | 167 |
| High | 92 |
| Low | 143 |
| High | 88 |
| Low | 140 |
| High | 84 |
| Low | 141 |
| High | 84 |
| Low | 143 |
| High | 82 |
| Low | 143 |
| High | 82 |
| Low | 143 |
| High | 84 |
| Low | 143 |
| High | 87 |
| Low | 140 |
| High | 89 |
| Low | 150 |
| High | 84 |
| Low | 73 |

Figure 3A:
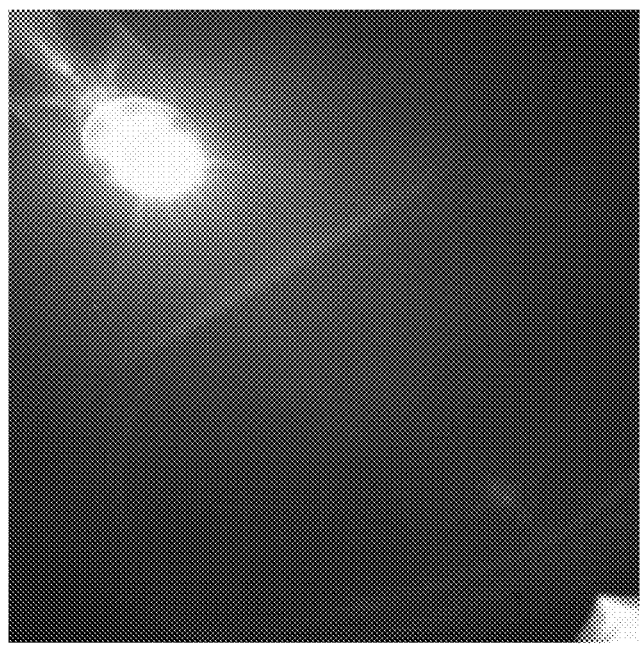
FIG. 3A is an imaging quality figure of the optical lens assembly according to the 3rd embodiment.
Figure 3B:
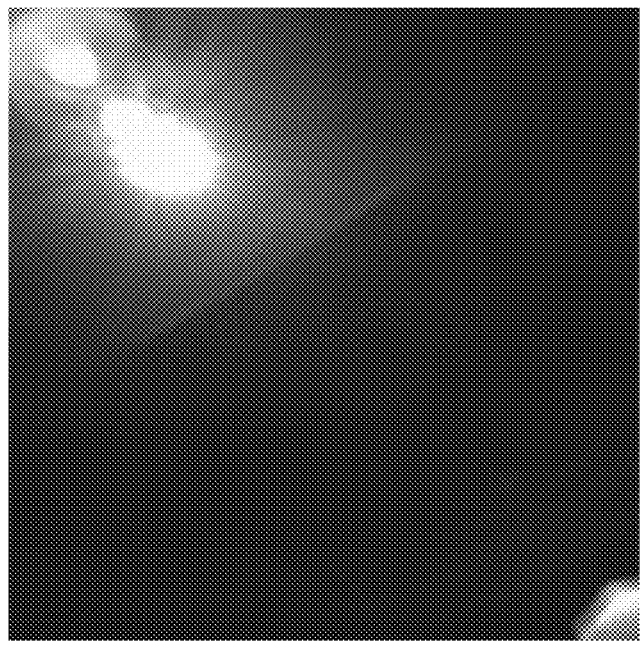
FIG. 3B is an imaging quality figure of the optical lens assembly according to the comparison.

Moreover, please refer to FIG. 3A and FIG. 3B. FIG. 3A is an imaging quality figure of the optical lens assembly according to the 3rd embodiment. FIG. 3B is an imaging quality figure of the optical lens assembly according to the comparison. The optical lens assembly of the 3rd embodiment does not include infrared filtering blue glass, but the optical lens assembly of the comparison includes an infrared filtering blue glass. From the upper right corners of FIG. 3A and FIG. 3B, it can be observed that there are obvious stray light spots generated by the optical lens assembly of the comparison, which does not shown in the optical lens assembly of the 3rd embodiment. Therefore, the defect of stray light caused by severe strong light reflection can be effectively solved by the optical lens assembly according to the present disclosure.

Furthermore, the average R/G ratio of the optical lens assembly of the 3rd embodiment at maximum image height (IMGH) is 0.98, the average B/G ratio of the optical lens assembly of the 3rd embodiment at maximum image height is 1.03, the average R/G ratio of the optical lens assembly of the comparison at maximum image height is 0.97, and the average B/G ratio of the optical lens assembly of the comparison at maximum image height is 1.02.

4th Embodiment

The optical lens assembly according to the 4th embodiment includes seven optical lens elements, which are, from an object side to an image side, the optical lens element L1, the optical lens element L2, the optical lens element L3, the optical lens element L4, the optical lens element L5, the optical lens element L6 and the optical lens element L7. At least one of the seven optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the seven optical lens elements includes a long-wavelength absorbing material, and the optical lens element including the long-wavelength absorbing material is made of a plastic material.

The detailed values of parameters of each of the optical lens elements in the optical lens assembly according to the 4th embodiment are shown in Table 15, Table 16 and Table 17 below. The definitions of these parameters shown in the following tables are the same as those stated in the 1st embodiment with corresponding values for the 4th embodiment, so an explanation in this regard will not be provided again.

TABLE 15

Incident Angles of Chief Ray of Each Optical Lens Element According to 4th Embodiment

| | Surface of Optical Lens Element | | | | | |
|---|---|---|---|---|---|---|
| Field | L1R1 | L1R2 | L2R1 | L2R2 | L3R1 | L3R2 |
| 0.00 | 0.00 | 0.00 | 0.00 | 0.00 | 0.00 | 0.00 |
| 0.05 | 1.75 | 1.92 | 2.99 | 1.86 | 3.02 | 1.88 |
| 0.10 | 3.48 | 3.83 | 5.97 | 3.72 | 6.02 | 3.75 |
| 0.15 | 5.20 | 5.73 | 8.93 | 5.55 | 9.01 | 5.59 |
| 0.20 | 6.89 | 7.59 | 11.86 | 7.36 | 11.96 | 7.40 |
| 0.25 | 8.54 | 9.42 | 14.75 | 9.13 | 14.87 | 9.15 |
| 0.30 | 10.13 | 11.19 | 17.57 | 10.85 | 17.71 | 10.84 |
| 0.35 | 11.66 | 12.90 | 20.33 | 12.50 | 20.48 | 12.46 |
| 0.40 | 13.14 | 14.57 | 23.04 | 14.12 | 23.20 | 14.02 |
| 0.45 | 14.58 | 16.21 | 25.74 | 15.70 | 25.90 | 15.52 |
| 0.50 | 15.98 | 17.82 | 28.43 | 17.26 | 28.58 | 16.99 |
| 0.55 | 17.34 | 19.38 | 31.09 | 18.77 | 31.23 | 18.38 |
| 0.60 | 18.62 | 20.87 | 33.67 | 20.21 | 33.79 | 19.68 |
| 0.65 | 19.81 | 22.28 | 36.16 | 21.57 | 36.24 | 20.88 |
| 0.70 | 20.94 | 23.63 | 38.60 | 22.88 | 38.62 | 22.00 |
| 0.75 | 22.03 | 24.94 | 41.02 | 24.14 | 40.97 | 23.05 |
| 0.80 | 23.08 | 26.23 | 43.46 | 25.39 | 43.30 | 24.03 |
| 0.85 | 24.08 | 27.48 | 45.90 | 26.59 | 45.61 | 24.94 |
| 0.90 | 25.03 | 28.68 | 48.32 | 27.75 | 47.84 | 25.75 |
| 0.95 | 25.87 | 29.75 | 50.57 | 28.80 | 49.85 | 26.44 |
| 1.00 | 26.66 | 30.77 | 52.78 | 29.79 | 51.75 | 27.04 |
| AICmax | 26.66 | 30.77 | 52.78 | 29.79 | 51.75 | 27.04 |

| | Surface of Optical Lens Element | | | | | |
|---|---|---|---|---|---|---|
| Field | L4R1 | L4R2 | L5R1 | L5R2 | L6R1 | L6R2 |
| 0.00 | 0.00 | 0.00 | 0.00 | 0.00 | 0.00 | 0.00 |
| 0.05 | 3.21 | 1.81 | 3.43 | 2.28 | 5.26 | 2.46 |
| 0.10 | 6.40 | 3.59 | 6.77 | 4.43 | 10.23 | 4.81 |
| 0.15 | 9.56 | 5.32 | 9.95 | 6.35 | 14.67 | 6.95 |
| 0.20 | 12.67 | 6.98 | 12.92 | 7.97 | 18.41 | 8.79 |
| 0.25 | 15.71 | 8.57 | 15.64 | 9.27 | 21.33 | 10.26 |

TABLE 15-continued

Incident Angles of Chief Ray of Each Optical Lens Element According to 4th Embodiment

| | | | | | | |
|---|---|---|---|---|---|---|
| 0.30 | 18.65 | 10.06 | 18.06 | 10.28 | 23.37 | 11.32 |
| 0.35 | 21.49 | 11.44 | 20.14 | 10.99 | 24.47 | 11.88 |
| 0.40 | 24.24 | 12.72 | 21.81 | 11.41 | 24.49 | 11.83 |
| 0.45 | 26.93 | 13.90 | 23.00 | 11.50 | 23.16 | 10.99 |
| 0.50 | 29.57 | 14.94 | 23.59 | 11.21 | 20.25 | 9.22 |
| 0.55 | 32.11 | 15.84 | 23.41 | 10.53 | 15.85 | 6.76 |
| 0.60 | 34.50 | 16.55 | 22.35 | 9.51 | 10.68 | 4.33 |
| 0.65 | 36.72 | 17.07 | 20.38 | 8.34 | 5.74 | 2.74 |
| 0.70 | 38.80 | 17.40 | 17.51 | 7.22 | 1.87 | 2.46 |
| 0.75 | 40.75 | 17.51 | 13.83 | 6.45 | 0.39 | 3.65 |
| 0.80 | 42.57 | 17.37 | 9.49 | 6.33 | 0.72 | 6.29 |
| 0.85 | 44.23 | 16.91 | 4.76 | 7.16 | 1.04 | 10.09 |
| 0.90 | 45.66 | 16.10 | 0.01 | 9.13 | 4.95 | 14.24 |
| 0.95 | 46.79 | 15.00 | 4.18 | 12.18 | 10.85 | 17.43 |
| 1.00 | 47.70 | 13.57 | 7.82 | 16.54 | 19.57 | 19.30 |
| AICmax | 47.70 | 17.51 | 23.59 | 16.54 | 24.49 | 19.30 |

| Surface of Optical Lens Element | | |
|---|---|---|
| Field | L7R1 | L7R2 |
| 0.00 | 0.00 | 0.00 |
| 0.05 | 0.59 | 4.70 |
| 0.10 | 0.70 | 8.84 |
| 0.15 | 0.01 | 12.02 |
| 0.20 | 1.51 | 14.07 |
| 0.25 | 3.63 | 15.15 |
| 0.30 | 5.93 | 15.54 |
| 0.35 | 8.05 | 15.47 |
| 0.40 | 9.73 | 14.97 |
| 0.45 | 10.80 | 13.97 |
| 0.50 | 11.12 | 12.59 |
| 0.55 | 10.45 | 11.03 |
| 0.60 | 8.54 | 9.45 |
| 0.65 | 5.19 | 7.75 |
| 0.70 | 0.24 | 5.62 |
| 0.75 | 6.49 | 3.01 |
| 0.80 | 15.13 | 0.27 |
| 0.85 | 25.44 | 2.03 |
| 0.90 | 36.17 | 3.48 |
| 0.95 | 44.87 | 3.72 |
| 1.00 | 51.80 | 2.79 |
| AICmax | 51.80 | 15.54 |

TABLE 16

Coating Evaluation of Each Optical Lens Element According to 4th Embodiment

| | | 82 | | | | |
|---|---|---|---|---|---|---|
| | FOV (degrees) | L1 | L2 | L3 | L4 | L5 |
| R1 | CT | 0.95 | 0.31 | 0.33 | 0.65 | 0.45 |
| | |SAGmax| | 0.77 | 0.16 | 0.12 | 0.09 | 0.20 |
| | Fc1 = CT/|SAGmax| | 1.23 | 1.99 | 2.70 | 7.13 | 2.28 |
| | |SPmin| | 1.01 | 2.00 | 4.00 | 5.56 | 0.63 |
| | |SPavg| | 2.29 | 10.53 | 12.50 | 16.13 | 2.99 |
| | Fc2 = |SPavg| × |SPmin| | 2.31 | 21.05 | 50.00 | 89.61 | 1.89 |
| | FC = LOG(Fc1 × Fc2) | 0.46 | 1.62 | 2.13 | 2.81 | 0.64 |
| R2 | |SAGmax| | 0.13 | 0.25 | 0.05 | 0.26 | 0.22 |
| | Fc1 = CT/|SAGmax| | 7.09 | 1.24 | 5.95 | 2.54 | 2.04 |
| | |SPmin| | 6.25 | 1.52 | 7.14 | 1.69 | 1.61 |
| | |SPavg| | 12.66 | 6.06 | 24.39 | 5.21 | 4.20 |
| | Fc2 = |SPavg| × SPmin| | 79.11 | 9.18 | 174.22 | 8.83 | 6.78 |
| | FC = LOG(Fc1 × Fc2) | 2.75 | 1.06 | 3.02 | 1.35 | 1.14 |

TABLE 16-continued

Coating Evaluation of Each Optical Lens Element According to 4th Embodiment

| | | L6 | L7 |
|---|---|---|---|
| R1 | CT | 0.58 | 0.76 |
| | |SAGmax| | 0.93 | 1.50 |
| | Fc1 = CT/|SAGmax| | 0.63 | 0.51 |
| | |SPmin| | 1.14 | 1.39 |
| | |SPavg| | 2.98 | 2.86 |
| | Fc2 = |SPavg| × |SPmin| | 3.38 | 3.97 |
| | FC = LOG(Fc1 × Fc2) | 0.33 | 0.30 |
| R2 | |SAGmax| | 0.11 | 1.50 |
| | Fc1 = CT/|SAGmax| | 5.51 | 0.51 |
| | |SPmin| | 1.56 | 1.08 |
| | |SPavg| | 3.39 | 2.91 |
| | Fc2 = |SPavg| × |SPmin| | 5.30 | 3.13 |
| | FC = LOG(Fc1 × Fc2) | 1.47 | 0.20 |

TABLE 17

Absorbing Evaluation of Each Optical Lens Element According to 4th Embodiment

| | L1 | L2 | L3 | L4 | L5 | L6 | L7 |
|---|---|---|---|---|---|---|---|
| CPavg | 1.03 | 1.05 | 1.06 | 1.01 | 1.00 | 0.96 | 1.64 |
| CPst | 0.02 | 0.05 | 0.05 | 0.02 | 0.03 | 0.07 | 0.40 |
| FA = LOG(1/(|(CPavg − 1) × CPst)|) | 3.12 | 2.59 | 2.46 | 3.82 | 4.62 | 2.62 | 0.59 |

5th Embodiment

The optical lens assembly according to the 5th embodiment includes eight optical lens elements, which are, from an object side to an image side, the optical lens element L1, the optical lens element L2, the optical lens element L3, the optical lens element L4, the optical lens element L5, the optical lens element L6, the optical lens element L7 and the optical lens element L8. At least one of the eight optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the eight optical lens elements includes a long-wavelength absorbing material, and the optical lens element including the long-wavelength absorbing material is made of a plastic material.

The detailed values of parameters of each of the optical lens elements in the optical lens assembly according to the 5th embodiment are shown in Table 18, Table 19 and Table 20 below. The definitions of these parameters shown in the following tables are the same as those stated in the 1st embodiment with corresponding values for the 5th embodiment, so an explanation in this regard will not be provided again.

TABLE 18

Incident Angles of Chief Ray of Each Optical Lens Element According to 5th Embodiment Surface of Optical Lens Element

| Field | L1R1 | L1R2 | L2R1 | L2R2 | L3R1 | L3R2 |
|---|---|---|---|---|---|---|
| 0.00 | 0.00 | 0.00 | 0.00 | 0.00 | 0.00 | 0.00 |
| 0.05 | 1.82 | 2.04 | 3.17 | 1.96 | 3.28 | 2.01 |
| 0.10 | 3.61 | 4.07 | 6.32 | 3.91 | 6.53 | 4.00 |
| 0.15 | 5.38 | 6.07 | 9.44 | 5.83 | 9.75 | 5.96 |
| 0.20 | 7.12 | 8.03 | 12.52 | 7.71 | 12.93 | 7.87 |
| 0.25 | 8.80 | 9.95 | 15.55 | 9.55 | 16.06 | 9.74 |
| 0.30 | 10.43 | 11.82 | 18.53 | 11.34 | 19.13 | 11.55 |
| 0.35 | 12.01 | 13.63 | 21.45 | 13.07 | 22.15 | 13.30 |
| 0.40 | 13.52 | 15.39 | 24.32 | 14.76 | 25.11 | 14.99 |
| 0.45 | 14.98 | 17.10 | 27.15 | 16.39 | 28.02 | 16.61 |
| 0.50 | 16.38 | 18.76 | 29.93 | 17.96 | 30.88 | 18.16 |
| 0.55 | 17.72 | 20.36 | 32.67 | 19.49 | 33.70 | 19.64 |
| 0.60 | 19.00 | 21.91 | 35.37 | 20.96 | 36.46 | 21.04 |
| 0.65 | 20.22 | 23.40 | 38.04 | 22.37 | 39.18 | 22.36 |
| 0.70 | 21.38 | 24.84 | 40.67 | 23.73 | 41.85 | 23.59 |
| 0.75 | 22.48 | 26.23 | 43.28 | 25.04 | 44.46 | 24.72 |
| 0.80 | 23.52 | 27.56 | 45.86 | 26.30 | 47.01 | 25.73 |
| 0.85 | 24.50 | 28.83 | 48.41 | 27.49 | 49.48 | 26.61 |
| 0.90 | 25.42 | 30.04 | 50.95 | 28.64 | 51.85 | 27.35 |
| 0.95 | 26.28 | 31.21 | 53.49 | 29.73 | 54.10 | 27.95 |
| 1.00 | 27.11 | 32.34 | 56.09 | 30.80 | 56.22 | 28.47 |
| AICmax | 27.11 | 32.34 | 56.09 | 30.80 | 56.22 | 28.47 |

Surface of Optical Lens Element

| Field | L4R1 | L4R2 | L5R1 | L5R2 | L6R1 | L6R2 |
|---|---|---|---|---|---|---|
| 0.00 | 0.00 | 0.00 | 0.00 | 0.00 | 0.00 | 0.00 |
| 0.05 | 3.31 | 1.91 | 3.38 | 2.08 | 4.13 | 3.54 |
| 0.10 | 6.60 | 3.80 | 6.72 | 4.14 | 8.15 | 6.78 |
| 0.15 | 9.85 | 5.64 | 9.98 | 6.15 | 12.00 | 9.49 |
| 0.20 | 13.06 | 7.43 | 13.12 | 8.06 | 15.65 | 11.61 |
| 0.25 | 16.22 | 9.15 | 16.06 | 9.82 | 19.08 | 13.17 |
| 0.30 | 19.31 | 10.78 | 18.73 | 11.37 | 22.30 | 14.29 |
| 0.35 | 22.33 | 12.31 | 21.08 | 12.66 | 25.24 | 15.07 |
| 0.40 | 25.29 | 13.72 | 23.05 | 13.63 | 27.79 | 15.57 |
| 0.45 | 28.17 | 14.99 | 24.57 | 14.26 | 29.76 | 15.77 |
| 0.50 | 30.96 | 16.12 | 25.62 | 14.51 | 30.88 | 15.58 |
| 0.55 | 33.66 | 17.08 | 26.15 | 14.39 | 30.91 | 14.97 |
| 0.60 | 36.25 | 17.85 | 26.14 | 13.93 | 29.59 | 13.97 |
| 0.65 | 38.68 | 18.39 | 25.56 | 13.18 | 26.65 | 12.73 |
| 0.70 | 40.93 | 18.64 | 24.42 | 12.25 | 21.94 | 11.56 |
| 0.75 | 42.92 | 18.54 | 22.73 | 11.26 | 15.61 | 10.89 |
| 0.80 | 44.57 | 18.03 | 20.62 | 10.39 | 8.32 | 11.24 |
| 0.85 | 45.81 | 17.06 | 18.39 | 9.97 | 1.18 | 12.94 |
| 0.90 | 46.55 | 15.66 | 16.56 | 10.40 | 4.54 | 16.02 |
| 0.95 | 46.80 | 13.96 | 15.97 | 12.27 | 7.68 | 20.06 |
| 1.00 | 46.72 | 12.26 | 18.05 | 16.51 | 7.08 | 23.76 |
| AICmax | 46.80 | 18.64 | 26.15 | 16.51 | 30.91 | 23.76 |

Surface of Optical Lens Element

| Field | L7R1 | L7R2 | L8R1 | L8R2 |
|---|---|---|---|---|
| 0.00 | 0.00 | 0.00 | 0.00 | 0.00 |
| 0.05 | 6.81 | 2.07 | 1.19 | 5.49 |
| 0.10 | 13.24 | 4.26 | 1.75 | 10.21 |
| 0.15 | 18.98 | 6.63 | 1.33 | 13.68 |
| 0.20 | 23.78 | 9.12 | 0.05 | 15.85 |
| 0.25 | 27.49 | 11.58 | 1.64 | 16.93 |
| 0.30 | 30.00 | 13.86 | 3.19 | 17.11 |
| 0.35 | 31.22 | 15.78 | 4.12 | 16.53 |
| 0.40 | 30.93 | 17.18 | 4.15 | 15.27 |
| 0.45 | 28.86 | 17.90 | 3.11 | 13.43 |
| 0.50 | 24.79 | 17.82 | 0.99 | 11.11 |
| 0.55 | 19.00 | 16.95 | 2.12 | 8.56 |
| 0.60 | 12.55 | 15.56 | 6.04 | 6.04 |
| 0.65 | 7.04 | 14.00 | 10.56 | 3.74 |
| 0.70 | 3.88 | 12.42 | 15.45 | 1.86 |
| 0.75 | 3.81 | 10.66 | 20.47 | 0.70 |
| 0.80 | 7.05 | 8.56 | 25.68 | 0.44 |
| 0.85 | 13.55 | 6.64 | 31.61 | 1.15 |
| 0.90 | 23.27 | 6.05 | 39.24 | 3.13 |
| 0.95 | 36.31 | 7.99 | 49.46 | 7.64 |
| 1.00 | 52.83 | 14.04 | 60.90 | 14.50 |
| AICmax | 52.83 | 17.90 | 60.90 | 17.11 |

TABLE 19

Coating Evaluation of Each Optical Lens Element According to 5th Embodiment

| | | 85 | | | | |
|---|---|---|---|---|---|---|
| FOV (degrees) | | L1 | L2 | L3 | L4 | L5 |
| | CT | 1.23 | 0.26 | 0.35 | 0.54 | 0.35 |
| R1 | \|SAGmax\| | 0.95 | 0.24 | 0.08 | 0.15 | 0.46 |
| | Fc1 = CT/\|SAGmax\| | 1.28 | 1.08 | 4.11 | 3.65 | 0.77 |
| | \|SPmin\| | 0.85 | 2.08 | 6.25 | 4.00 | 1.89 |
| | \|SPavg\| | 2.22 | 7.81 | 18.52 | 12.99 | 5.26 |
| | Fc2 = \|SPavg\| × \|SPmin\| | 1.90 | 16.28 | 115.74 | 51.95 | 9.93 |
| | FC = LOG(Fc1 × Fc2) | 0.39 | 1.25 | 2.68 | 2.28 | 0.88 |
| R2 | \|SAGmax\| | 0.17 | 0.35 | 0.04 | 0.41 | 0.48 |
| | Fc1 = CT/\|SAGmax\| | 7.26 | 0.74 | 8.79 | 1.32 | 0.73 |
| | \|SPmin\| | 4.17 | 1.43 | 5.88 | 1.75 | 2.00 |
| | \|SPavg\| | 11.49 | 4.81 | 27.78 | 5.32 | 5.56 |
| | Fc2 = \|SPavg\| × \|SPmin\| | 47.89 | 6.87 | 163.40 | 9.33 | 11.11 |
| | FC = LOG(Fc1 × Fc2) | 2.54 | 0.71 | 3.16 | 1.09 | 0.91 |

| | | L6 | L7 | L8 |
|---|---|---|---|---|
| | CT | 0.41 | 0.79 | 0.57 |
| R1 | \|SAGmax\| | 0.83 | 0.69 | 1.41 |
| | Fc1 = CT/\|SAGmax\| | 0.50 | 1.15 | 0.41 |
| | \|SPmin\| | 0.68 | 1.41 | 1.89 |
| | \|SPavg\| | 3.11 | 3.64 | 3.69 |
| | Fc2 = \|SPavg\| × \|SPmin\| | 2.13 | 5.12 | 6.96 |
| R2 | FC = LOG(Fc1 × Fc2) | 0.02 | 0.77 | 0.45 |
| | \|SAGmax\| | 0.66 | 0.99 | 1.41 |
| | Fc1 = CT/\|SAGmax\| | 0.62 | 0.80 | 0.40 |
| | \|SPmin\| | 1.85 | 1.20 | 1.43 |
| | \|SPavg\| | 4.41 | 3.64 | 3.39 |
| | Fc2 = \|SPavg\| × \|SPmin\| | 8.16 | 4.38 | 4.84 |
| | FC = LOG(Fc1 × Fc2) | 0.70 | 0.55 | 0.29 |

TABLE 20

Absorbing Evaluation of Each Optical Lens Element According to 5th Embodiment

| | L1 | L2 | L3 | L4 | L5 | L6 | L7 | L8 |
|---|---|---|---|---|---|---|---|---|
| CPavg | 1.03 | 1.06 | 1.07 | 0.99 | 1.01 | 1.09 | 1.01 | 1.76 |
| CPst | 0.03 | 0.05 | 0.06 | 0.04 | 0.01 | 0.14 | 0.11 | 0.47 |
| FA = LOG(1/(\|(CPavg − 1) × CPst\|)) | 3.02 | 2.54 | 2.39 | 3.71 | 4.07 | 1.87 | 2.83 | 0.45 |

6th Embodiment

The optical lens assembly according to the 6th embodiment includes nine optical lens elements, which are, from an object side to an image side, the optical lens element L1, the optical lens element L2, the optical lens element L3, the optical lens element L4, the optical lens element L5, the optical lens element L6, the optical lens element L7, the optical lens element L8 and the optical lens element L9. At least one of the nine optical lens elements includes an infrared filtering coating, the optical lens element including the infrared filtering coating is made of a plastic material, the infrared filtering coating is arranged on an object-side surface or an image-side surface of the optical lens element, a surface of the optical lens element including the infrared filtering coating is aspheric, and the infrared filtering coating includes at least two different refractive indices. At least one of the nine optical lens elements includes a long-wavelength absorbing material, and the optical lens element including the long-wavelength absorbing material is made of a plastic material.

The detailed values of parameters of each of the optical lens elements in the optical lens assembly according to the 6th embodiment are shown in Table 21, Table 22 and Table 23 below. The definitions of these parameters shown in the following tables are the same as those stated in the 1st embodiment with corresponding values for the 6th embodiment, so an explanation in this regard will not be provided again.

TABLE 21

Incident Angles of Chief Ray of Each Optical Lens Element According to 6th Embodiment

| | Surface of Optical Lens Element | | | | | |
|---|---|---|---|---|---|---|
| Field | L1R1 | L1R2 | L2R1 | L2R2 | L3R1 | L3R2 |
| 0.00 | 0.00 | 0.00 | 0.00 | 0.00 | 0.00 | 0.00 |
| 0.05 | 1.96 | 2.04 | 3.16 | 1.98 | 3.40 | 2.11 |
| 0.10 | 3.90 | 4.07 | 6.32 | 3.96 | 6.79 | 4.21 |
| 0.15 | 5.83 | 6.08 | 9.46 | 5.91 | 10.15 | 6.28 |
| 0.20 | 7.72 | 8.06 | 12.56 | 7.84 | 13.49 | 8.33 |
| 0.25 | 9.56 | 10.00 | 15.63 | 9.72 | 16.79 | 10.33 |
| 0.30 | 11.34 | 11.88 | 18.63 | 11.55 | 20.03 | 12.26 |
| 0.35 | 13.05 | 13.69 | 21.55 | 13.31 | 23.18 | 14.13 |
| 0.40 | 14.69 | 15.45 | 24.41 | 15.00 | 26.27 | 15.91 |
| 0.45 | 16.26 | 17.14 | 27.21 | 16.64 | 29.31 | 17.63 |
| 0.50 | 17.76 | 18.78 | 29.96 | 18.22 | 32.29 | 19.28 |
| 0.55 | 19.20 | 20.35 | 32.65 | 19.73 | 35.20 | 20.85 |
| 0.60 | 20.55 | 21.84 | 35.26 | 21.18 | 38.04 | 22.32 |
| 0.65 | 21.83 | 23.28 | 37.82 | 22.55 | 40.82 | 23.71 |
| 0.70 | 23.05 | 24.66 | 40.33 | 23.88 | 43.56 | 25.02 |
| 0.75 | 24.22 | 25.99 | 42.83 | 25.15 | 46.26 | 26.25 |
| 0.80 | 25.32 | 27.26 | 45.29 | 26.37 | 48.92 | 27.39 |
| 0.85 | 26.35 | 28.48 | 47.72 | 27.53 | 51.52 | 28.43 |
| 0.90 | 27.33 | 29.64 | 50.11 | 28.64 | 54.04 | 29.38 |
| 0.95 | 28.25 | 30.75 | 52.50 | 29.70 | 56.51 | 30.24 |
| 1.00 | 29.11 | 31.81 | 54.87 | 30.71 | 58.85 | 31.01 |
| AICmax | 29.11 | 31.81 | 54.87 | 30.71 | 58.85 | 31.01 |

| | Surface of Optical Lens Element | | | | | |
|---|---|---|---|---|---|---|
| Field | L4R1 | L4R2 | L5R1 | L5R2 | L6R1 | L6R2 |
| 0.00 | 0.00 | 0.00 | 0.00 | 0.00 | 0.00 | 0.00 |
| 0.05 | 3.47 | 2.19 | 3.54 | 2.13 | 3.79 | 2.41 |
| 0.10 | 6.93 | 4.37 | 7.06 | 4.24 | 7.55 | 4.80 |
| 0.15 | 10.38 | 6.54 | 10.55 | 6.31 | 11.23 | 7.12 |
| 0.20 | 13.82 | 8.68 | 14.01 | 8.31 | 14.76 | 9.29 |
| 0.25 | 17.23 | 10.80 | 17.40 | 10.23 | 18.04 | 11.21 |
| 0.30 | 20.58 | 12.86 | 20.71 | 12.02 | 20.99 | 12.77 |
| 0.35 | 23.88 | 14.86 | 23.90 | 13.69 | 23.52 | 13.93 |
| 0.40 | 27.13 | 16.79 | 26.97 | 15.20 | 25.56 | 14.66 |
| 0.45 | 30.33 | 18.64 | 29.91 | 16.56 | 27.05 | 14.96 |
| 0.50 | 33.49 | 20.41 | 32.68 | 17.74 | 27.85 | 14.80 |
| 0.55 | 36.60 | 22.07 | 35.24 | 18.72 | 27.76 | 14.10 |
| 0.60 | 39.63 | 23.59 | 37.50 | 19.47 | 26.62 | 12.84 |
| 0.65 | 42.60 | 24.97 | 39.45 | 20.00 | 24.40 | 11.18 |
| 0.70 | 45.53 | 26.20 | 41.04 | 20.33 | 21.27 | 9.54 |
| 0.75 | 48.41 | 27.26 | 42.26 | 20.49 | 17.67 | 8.53 |
| 0.80 | 51.24 | 28.14 | 43.14 | 20.59 | 14.08 | 8.65 |
| 0.85 | 54.01 | 28.83 | 43.77 | 20.82 | 10.94 | 10.18 |
| 0.90 | 56.68 | 29.30 | 44.37 | 21.47 | 8.46 | 13.23 |
| 0.95 | 59.26 | 29.52 | 45.33 | 22.95 | 6.73 | 17.78 |
| 1.00 | 61.60 | 29.44 | 47.54 | 25.82 | 5.89 | 22.78 |
| AICmax | 61.60 | 29.52 | 47.54 | 25.82 | 27.85 | 22.78 |

| | Surface of Optical Lens Element | | | | | |
|---|---|---|---|---|---|---|
| Field | L7R1 | L7R2 | L8R1 | L8R2 | L9R1 | L9R2 |
| 0.00 | 0.00 | 0.00 | 0.00 | 0.00 | 0.00 | 0.00 |
| 0.05 | 4.74 | 2.88 | 5.95 | 3.64 | 0.22 | 4.27 |
| 0.10 | 9.56 | 5.76 | 11.50 | 7.16 | 0.20 | 7.84 |
| 0.15 | 14.44 | 8.59 | 16.27 | 10.42 | 0.09 | 10.28 |
| 0.20 | 19.24 | 11.24 | 19.82 | 13.26 | 0.31 | 11.54 |
| 0.25 | 23.63 | 13.53 | 21.62 | 15.49 | 0.19 | 11.98 |
| 0.30 | 27.24 | 15.25 | 21.05 | 16.85 | 1.82 | 12.02 |
| 0.35 | 29.76 | 16.26 | 17.73 | 17.07 | 4.47 | 11.83 |
| 0.40 | 30.95 | 16.44 | 11.90 | 16.00 | 7.49 | 11.37 |
| 0.45 | 30.61 | 15.70 | 4.78 | 13.65 | 9.95 | 10.73 |
| 0.50 | 28.43 | 13.98 | 1.90 | 10.12 | 11.11 | 10.15 |
| 0.55 | 24.01 | 11.31 | 6.75 | 5.82 | 11.04 | 9.75 |
| 0.60 | 17.35 | 8.01 | 9.18 | 1.85 | 10.92 | 9.40 |
| 0.65 | 9.33 | 4.78 | 9.19 | 0.71 | 12.13 | 8.72 |
| 0.70 | 1.63 | 2.48 | 6.99 | 1.55 | 15.57 | 7.59 |
| 0.75 | 4.09 | 1.72 | 2.85 | 1.03 | 21.42 | 6.64 |
| 0.80 | 7.07 | 2.51 | 3.01 | 0.06 | 29.26 | 6.90 |
| 0.85 | 7.27 | 4.37 | 10.43 | 1.07 | 38.04 | 8.97 |
| 0.90 | 4.85 | 6.27 | 19.31 | 1.90 | 45.99 | 12.25 |
| 0.95 | 0.42 | 7.18 | 30.01 | 3.35 | 50.59 | 14.31 |
| 1.00 | 8.76 | 8.07 | 43.63 | 7.84 | 52.42 | 14.03 |
| AICmax | 30.95 | 16.44 | 43.63 | 17.07 | 52.42 | 14.31 |

TABLE 22

Coating Evaluation of Each Optical Lens Element According to 6th Embodiment

| | | 87 | | | | |
|---|---|---|---|---|---|---|
| | FOV (degrees) | L1 | L2 | L3 | L4 | L5 |
| | CT | 1.01 | 0.33 | 0.35 | 0.43 | 0.44 |
| R1 | |SAGmax| | 0.87 | 0.28 | 0.02 | 0.09 | 0.04 |
| | Fc1 = CT/|SAGmax| | 1.15 | 1.17 | 16.37 | 4.61 | 12.25 |
| | |SPmin| | 1.12 | 1.69 | 8.33 | 5.26 | 9.09 |
| | |SPavg| | 2.42 | 6.41 | 25.64 | 22.22 | 24.39 |
| | Fc2 = |SPavg| × |SPmin| | 2.72 | 10.86 | 213.68 | 116.96 | 221.73 |
| | FC = LOG(Fc1 × Fc2) | 0.50 | 1.10 | 3.54 | 2.73 | 3.43 |
| R2 | |SAGmax| | 0.19 | 0.36 | 0.05 | 0.02 | 0.14 |
| | Fc1 = CT/|SAGmax| | 5.34 | 0.90 | 6.96 | 24.25 | 3.16 |
| | |SPmin| | 5.56 | 1.35 | 4.55 | 7.14 | 5.26 |
| | |SPavg| | 10.64 | 4.44 | 26.32 | 35.71 | 14.71 |
| | Fc2 = |SPavg| × |SPmin| | 59.10 | 6.01 | 119.62 | 255.10 | 77.40 |
| | FC = LOG(Fc1 × Fc2) | 2.50 | 0.73 | 2.92 | 3.79 | 2.39 |

TABLE 22-continued

|  |  | L6 | L7 | L8 | L9 |
|---|---|---|---|---|---|
|  | CT | 0.45 | 0.52 | 0.66 | 0.79 |
| R1 | \|SAGmax\| | 0.72 | 1.21 | 1.57 | 1.40 |
|  | Fc1 = CT/\|SAGmax\| | 0.62 | 0.43 | 0.42 | 0.56 |
|  | \|SPmin\| | 0.81 | 0.69 | 1.04 | 2.27 |
|  | \|SPavg\| | 3.51 | 2.35 | 2.56 | 4.42 |
|  | Fc2 = \|SPavg\| × \|SPmin\| | 2.85 | 1.63 | 2.67 | 10.06 |
|  | FC = LOG(Fc1 × Fc2) | 0.25 | −0.15 | 0.05 | 0.75 |
| R2 | \|SAGmax\| | 0.75 | 1.36 | 1.74 | 1.58 |
|  | Fc1 = CT/\|SAGmax\| | 0.60 | 0.38 | 0.38 | 0.50 |
|  | \|SPmin\| | 1.52 | 0.81 | 0.96 | 1.96 |
|  | \|SPavg\| | 4.15 | 2.54 | 2.39 | 4.05 |
|  | Fc2 = \|SPavg\| × \|SPmin\| | 6.29 | 2.05 | 2.30 | 7.94 |
|  | FC = LOG(Fc1 × Fc2) | 0.58 | −0.10 | −0.06 | 0.60 |

TABLE 23

Absorbing Evaluation of Each Optical Lens Element According to 6th Embodiment

|  | L1 | L2 | L3 | L4 | L5 | L6 | L7 | L8 | L9 |
|---|---|---|---|---|---|---|---|---|---|
| CPavg | 1.03 | 1.06 | 1.08 | 1.06 | 1.00 | 1.02 | 1.00 | 1.27 | 1.39 |
| CPst | 0.03 | 0.05 | 0.06 | 0.04 | 0.02 | 0.04 | 0.07 | 0.22 | 0.23 |
| FA = LOG(1/(\|(CPavg − 1) × CPst)\|) | 3.06 | 2.54 | 2.31 | 2.65 | 5.50 | 2.99 | 3.67 | 1.22 | 1.05 |

According to the optical lens assembly of the present disclosure, the oblique ray through the center of the aperture stop of the optical system is called the chief ray, or the principal ray.

According to the present disclosure, the 3rd embodiment is the only one embodiment for complete demonstration. The same or optimized coating design, coating layer configuration, coating thickness configuration and/or absorbing material configuration can be applied to other embodiments to achieve the same excellent results, such as the same excellent transmittance, image quality and color uniformity.

7th Embodiment to 20th Embodiment

The optical lens assemblies of the 7th embodiment to the 11th embodiment respectively have seven optical lens elements, which are a first optical lens element L1, a second optical lens element L2, a third optical lens element L3, a fourth optical lens element L4, a fifth optical lens element L5, a sixth optical lens element L6 and a seventh optical lens element L7. Each of the seven optical lens elements has an object-side surface R1 and an image-side surface R2.

The configurations of the optical lens assemblies according to the 7th embodiment to the 11th embodiment are shown in Table 24 below. An angle of the chief ray in the field of maximum image height of the optical lens assembly incident into a surface (image surface) of the image sensor is CRA, and the symbol "*" means that the specific optical lens element or the specific surface of the optical lens element includes the long-wavelength absorbing material or the infrared filtering coating.

TABLE 24

| Embodiment | | 7 | 8 | 9 | 10 | 11 |
|---|---|---|---|---|---|---|
| Number of Optical Lens Elements | | 7 | 7 | 7 | 7 | 7 |
| CRA (degrees) | | 43 | 42 | 41 | 42 | 42 |
| Evaluation of Long-Wavelength Absorbing Material | | | | | | |
| L1 | |  | * | * | * | * |
| L2 | |  |  |  |  |  |
| L3 | |  |  | * | * | * |
| L4 | |  |  | * | * |  |
| L5 | |  | * | * |  |  |
| L6 | |  |  |  |  |  |
| L7 | |  |  | * |  |  |
| Optical Element at Image Side | | * |  |  |  | * |
| Evaluation of Infrared Filtering Coating | | | | | | |
| L1 | R1 |  |  | * |  |  |
|  | R2 | * | * | * | * | * |

TABLE 24-continued

| Embodiment | | 7 | 8 | 9 | 10 | 11 |
|---|---|---|---|---|---|---|
| L2 | R1 | * | * | * | * | * |
|  | R2 |  | * |  | * |  |
| L3 | R1 | * |  |  | * | * |
|  | R2 |  | * | * | * | * |
| L4 | R1 |  | * | * | * |  |
|  | R2 |  | * | * | * |  |
| L5 | R1 |  |  |  |  |  |
|  | R2 |  |  |  |  |  |
| L6 | R1 |  |  |  |  |  |
|  | R2 |  |  |  |  |  |
| L7 | R1 |  |  |  |  |  |
|  | R2 |  |  |  |  |  |

The angle of the chief ray in the field of maximum image height of the optical lens assembly of the 7th embodiment incident into the surface of the cover glass is 43 degrees. The optical lens assembly of the 7th embodiment is an optical system with seven optical lens elements. After the long-wavelength absorbing material mixed with the polymer, it is arranged on the surface of the optical element at an image-side end of the optical lens assembly or mixed therewith according to the requirement, such as arranged on a polymer layer on the surface of the cover glass, a polymer layer between a plurality of cover glasses, a polymer layer on the surface of the micro lens, a polymer layer between the micro lens and the color filter or mixed in the color filter. According to the factor evaluating result of the present disclosure, the infrared filtering coating can be chosen to be arranged on the image-side surface R2 of the first optical lens element L1, the object-side surface R1 of the second optical lens element L2, the object-side surface R1 of the third optical lens element L3 or the combination thereof.

The angle of the chief ray in the field of maximum image height of the optical lens assembly of the 9th embodiment incident into the surface of the cover glass is 41 degrees. The optical lens assembly of the 9th embodiment is an optical system with seven optical lens elements. According to the factor evaluating result of the present disclosure, the long-wavelength absorbing material can be chosen to be added into the first optical lens element L1, the third optical lens element L3, the fourth optical lens element L4, the fifth optical lens element L5, the seven optical lens element L7 or the combination thereof. According to the factor evaluating result of the present disclosure, the infrared filtering coating can be chosen to be arranged on the object-side surface R1 of the first optical lens element L1, the image-side surface R2 of the first optical lens element L1, the object-side surface R1 of the second optical lens element L2, the image-side surface R2 of the third optical lens element L3, the object-side surface R1 of the fourth optical lens element L4, the image-side surface R2 of the fourth optical lens element L4 or the combination thereof.

The optical lens assemblies of the 12th embodiment to the 18th embodiment respectively have eight optical lens elements, which are a first optical lens element L1, a second optical lens element L2, a third optical lens element L3, a fourth optical lens element L4, a fifth optical lens element L5, a sixth optical lens element L6, a seventh optical lens element L7 and an eighth optical lens element L8. Each of the eight optical lens elements has an object-side surface R1 and an image-side surface R2.

The configurations of the optical lens assemblies according to the 12th embodiment to the 18th embodiment are shown in Table 25 below. The definitions of these parameters shown in the following table are the same as those stated in the 7th embodiment to the 11th embodiment with corresponding values for the 12th embodiment to the 18th embodiment, so an explanation in this regard will not be provided again.

TABLE 25

| Embodiment | | 12 | 13 | 14 | 15 | 16 | 17 | 18 |
|---|---|---|---|---|---|---|---|---|
| Number of Optical Lens Elements | | 8 | 8 | 8 | 8 | 8 | 8 | 8 |
| CRA (degrees) | | 42 | 43 | 42 | 40 | 42 | 46 | 41 |
| Evaluation of Long-Wavelength Absorbing Material | | | | | | | | |
| L1 | | | * | * | * | * | * | |
| L2 | | | | | | | | * |
| L3 | | | | * | | * | * | |
| L4 | | | * | * | * | * | | |
| L5 | | | * | * | * | | * | * |
| L6 | | | | | | | | |
| L7 | | | * | * | * | * | * | * |
| L8 | | | | | | | * | |
| Optical Element at Image Side | | * | | * | | | | |
| Evaluation of Infrared Filtering Coating | | | | | | | | |
| L1 | R1 | | | | | | | * |
| | R2 | | | | | | * | * |
| L2 | R1 | | | * | * | * | | |
| | R2 | | | | * | * | * | * |
| L3 | R1 | * | * | * | * | * | * | |
| | R2 | * | * | * | * | * | * | |
| L4 | R1 | * | * | * | * | * | * | |
| | R2 | | * | * | * | * | | |
| L5 | R1 | | | * | * | | | |
| | R2 | * | * | * | | | | |
| L6 | R1 | | | * | | | | |
| | R2 | | | | | | | |

TABLE 25-continued

| Embodiment | | 12 | 13 | 14 | 15 | 16 | 17 | 18 |
|---|---|---|---|---|---|---|---|---|
| L7 | R1 | | | | | | | |
| | R2 | | | | | | | |
| L8 | R1 | | | | | | | |
| | R2 | | | | | | | |

The optical lens assemblies of the 19th embodiment and the 20th embodiment respectively have nine optical lens elements, which are a first optical lens element L1, a second optical lens element L2, a third optical lens element L3, a fourth optical lens element L4, a fifth optical lens element L5, a sixth optical lens element L6, a seventh optical lens element L7, an eighth optical lens element L8 and a ninth optical lens element L9. Each of the nine optical lens elements has an object-side surface R1 and an image-side surface R2.

The configurations of the optical lens assemblies according to the 19th embodiment and the 20th embodiment are shown in Table 26 below. The definitions of these parameters shown in the following table are the same as those stated in the 7th embodiment to the 11th embodiment with corresponding values for the 19th embodiment and the 20th embodiment, so an explanation in this regard will not be provided again.

TABLE 26

| | | Embodiment | |
|---|---|---|---|
| | | 19 | 20 |
| Number of Optical Lens Elements | | 9 | 9 |
| CRA (degrees) | | 41 | 41 |
| Evaluation of Long-Wavelength Absorbing Material | | | |
| L1 | | | |
| L2 | | | |
| L3 | | | |
| L4 | | | * |
| L5 | | | * |
| L6 | | | |
| L7 | | | |
| L8 | | | * |
| L9 | | | * |
| Optical Element at Image Side | | * | |
| Evaluation of Infrared Filtering Coating | | | |
| L1 | R1 | | |
| | R2 | * | * |
| L2 | R1 | * | * |
| | R2 | * | * |
| L3 | R1 | * | * |
| | R2 | * | * |
| L4 | R1 | * | * |
| | R2 | * | * |
| L5 | R1 | * | * |
| | R2 | | * |
| L6 | R1 | | * |
| | R2 | | * |
| L7 | R1 | | |
| | R2 | | |
| L8 | R1 | | |
| | R2 | | |
| L9 | R1 | | |
| | R2 | | |

The angle of the chief ray in the field of maximum image height of the optical lens assembly of the 19th embodiment incident into the surface of the cover glass is 41 degrees. The optical lens assembly of the 19th embodiment is an optical system with nine optical lens elements. After the long-wavelength absorbing material mixed with the polymer, it is arranged on the surface of the optical element at an image-side end of the optical lens assembly or mixed therewith according to the requirement, such as arranged on a polymer layer on the surface of the cover glass, a polymer layer between a plurality of cover glasses, a polymer layer on the surface of the micro lens, a polymer layer between the micro lens and the color filter or mixed in the color filter. According to the factor evaluating result of the present disclosure, the infrared filtering coating can be chosen to be arranged on the image-side surface R2 of the first optical lens element L1, the object-side surface R1 of the second optical lens element L2, the image-side surface R2 of the second optical lens element L2, the object-side surface R1 of the third optical lens element L3, the image-side surface R2 of the third optical lens element L3, the object-side surface R1 of the fourth optical lens element L4, the image-side surface R2 of the fourth optical lens element L4, the object-side surface R1 of the fifth optical lens element L5 or the combination thereof.

Figure 4:
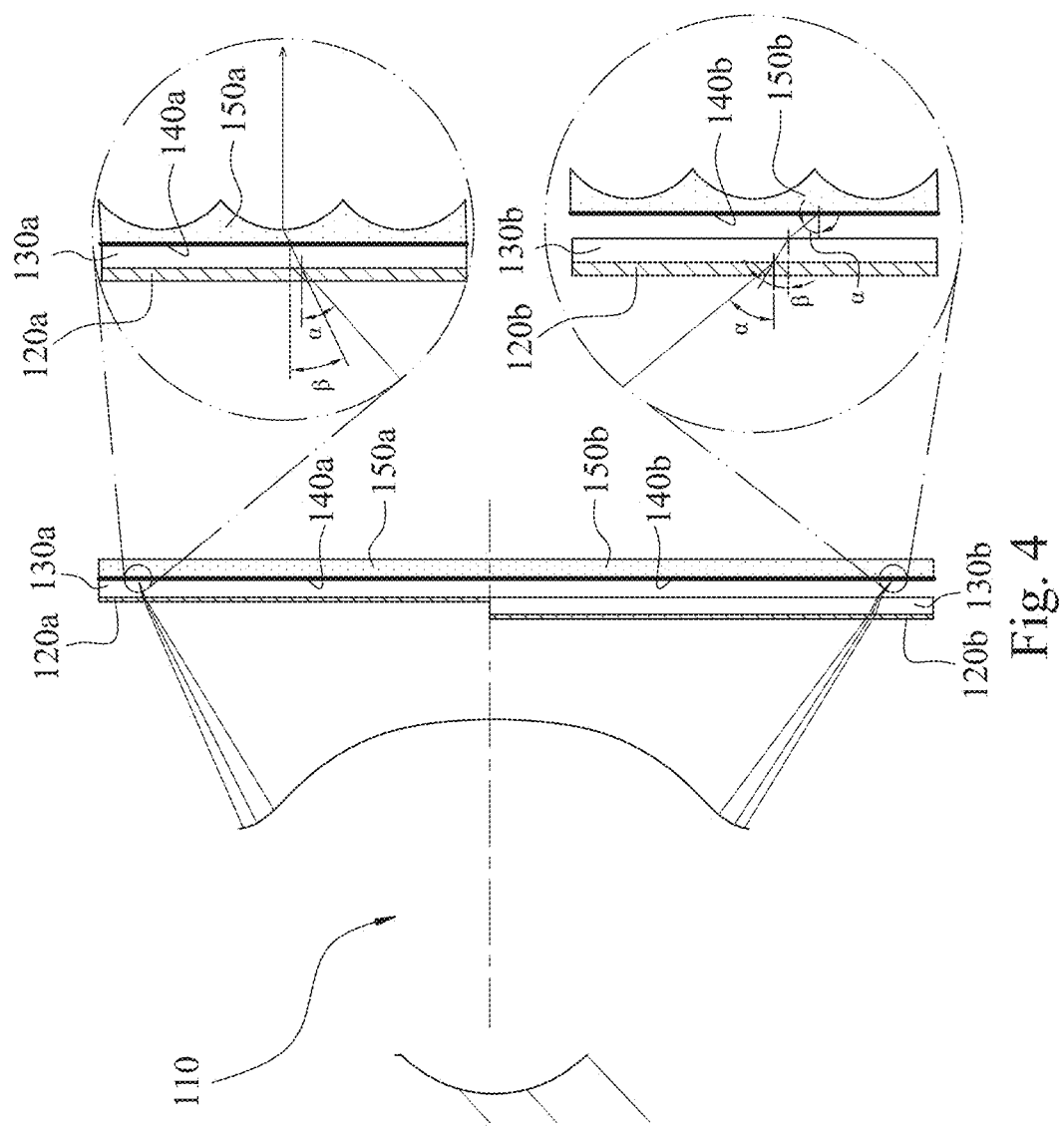
FIG. 4 is a structural schematic view of a conventional optical lens assembly and an optical lens assembly according to the present disclosure.

Please refer to FIG. 4. FIG. 4 is a structural schematic view of a conventional optical lens assembly and an optical lens assembly according to the present disclosure. The upper part of FIG. 4 is the structural schematic view of the optical lens assembly according to the present disclosure, and the lower part of FIG. 4 is the structural schematic view of the conventional optical lens assembly.

The conventional optical lens assembly includes, from an object side to an image side, an optical system 110, a cover glass 130*b* and an image sensor 150*b*. An object-side surface of the cover glass 130*b* includes an anti-reflective coating 120*b*. In detail, the arrangement of the cover glass 130*b* of the conventional optical lens assembly is that there is an air gap between the cover glass 130*b* and a surface 140*b* (image surface) of the image sensor 150*b*. An angle of a chief ray in the field of maximum image height incident into a surface of the cover glass 130*b* is a (that is, CRAg). When the chief ray refracted by the cover glass 130*b*, the angle becomes β, which is relatively smaller. After the chief ray transmitted from the cover glass 130*b* and then refracted by the air, the angle turns back into a (that is, CRA). When the angle of chief ray is too large, it will cause the light to fail to enter the image sensor 150*b*, or cause the pixel misalignment response, which leads to color shift and image quality reduction.

The optical lens assembly according to the present disclosure includes, from an object side to an image side, an optical system 110, a cover glass 130*a* and an image sensor 150*a*. An object-side surface of the cover glass 130*a* includes an anti-reflective coating 120*a*. In detail, the arrangement of the cover glass 130*a* of the optical lens assembly according to the present disclosure is that the cover glass 130*a* is directly arranged on a surface 140*a* of the image sensor 150*a*. An angle of a chief ray in the field of maximum image height incident into a surface of the cover glass 130*a* is a (that is, CRAg). When the chief ray refracted by the cover glass 130*a*, the angle becomes p. Because there is no air gap between the cover glass 130*a* and the surface 140*a* of the image sensor 150*a*, the chief ray can be directly incident into the image sensor 150*a* with a smaller angle β (that is, CRA). The design of the optical lens assembly according to the present disclosure can effectively prevent the imaging failure of the light with large angle and the color shifting problem. Also, the advantages of reducing the chief ray angle, the back focal length, the total length of the optical lens assembly and the maximum image height and simplifying the manufacturing process can be achieved.

21st Embodiment to 24th Embodiment

According to the present disclosure, the optical lens elements or the optical elements of the optical lens assembly can further include a long-wavelength absorbing material (LA8) for absorbing a wavelength between 850 nm-1200 nm, and an absorbing peak thereof is about 1050 nm, so as to enhance the complete filtering effect of infrared. A wavelength of 50% transmittance (T50) of the aforementioned long-wavelength absorbing material can be between 900 nm-1000 nm. The concentration of the long-wavelength absorbing material of the present disclosure can be 0%-1.0%, 0%-0.5%, 0%-0.25%, 0%-0.10%, 0%-0.05%, 0%-0.025% or 0%-0.01%.

Figure 5:
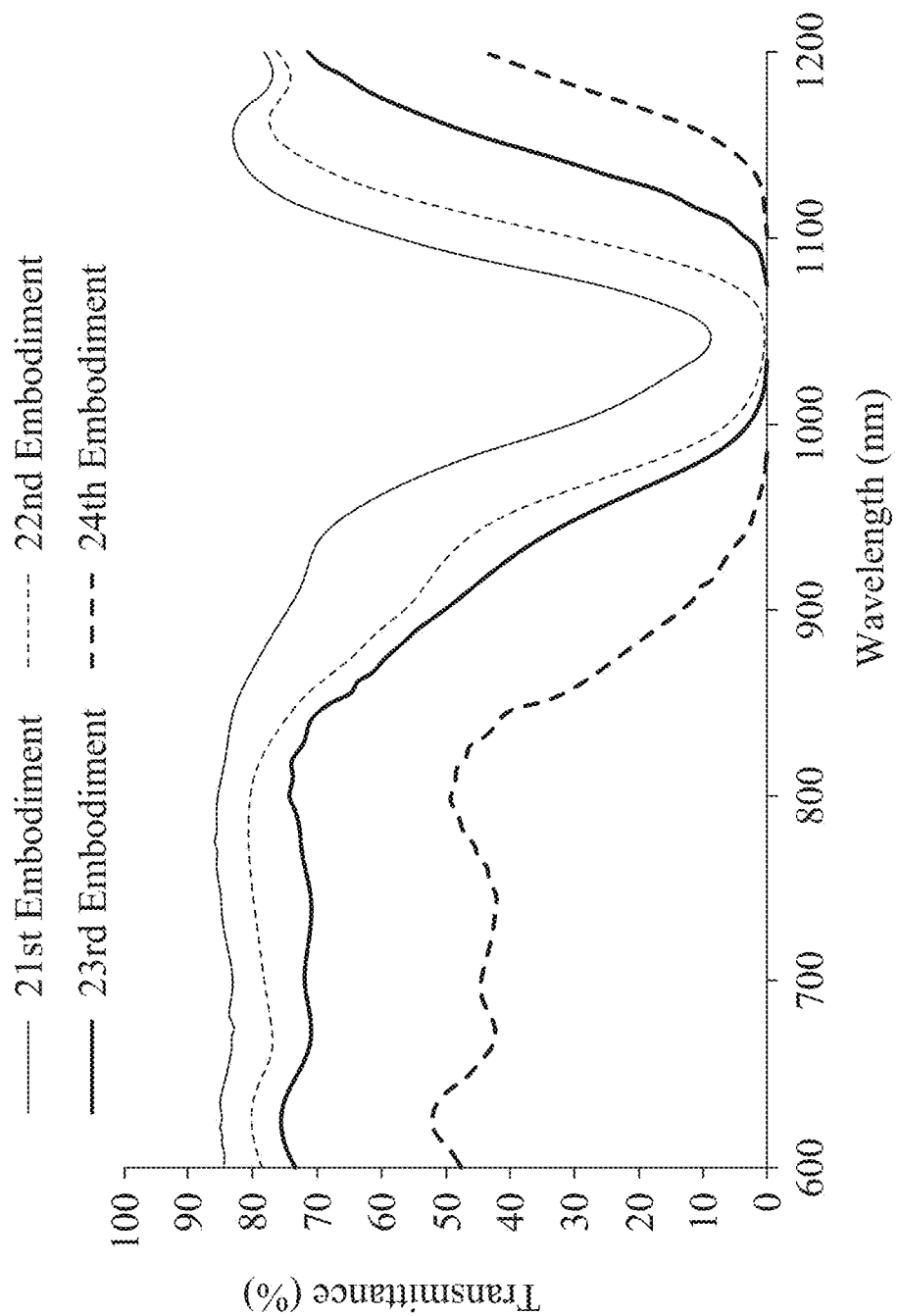
FIG. 5 is a relationship diagram of transmittance and wavelength of the optical lens elements according to the 21st embodiment to the 24th embodiment.

Please refer to FIG. 5. FIG. 5 is a relationship diagram of transmittance and wavelength of the optical lens elements according to the 21st embodiment to the 24th embodiment. The 21st embodiment to the 24th embodiment are the optical lens elements including the long-wavelength absorbing material LA8, and the transmittance at different wavelength thereof is shown in Table 27 below.

TABLE 27

| | Embodiment | | | |
|---|---|---|---|---|
| | 21 | 22 | 23 | 24 |
| LA8 Concentration (%) | 0-0.05 | 0-0.10 | 0-0.25 | 0-1.0 |
| | Transmittance of Optical Lens Element (%, 0 degrees) | | | |
| T4070 | 80.34 | 72.22 | 68.44 | 39.58 |
| T5060 | 82.22 | 74.46 | 69.58 | 39.71 |
| T7080 | 84.88 | 79.73 | 71.99 | 44.62 |
| T90120 | 54.03 | 36.57 | 22.68 | 6.00 |
| T95110 | 33.09 | 11.94 | 5.35 | 0.21 |
| T100110 | 24.15 | 6.06 | 0.65 | 0 |
| T40 | 63.59 | 48.01 | 48.58 | 16.54 |
| T45 | 77.28 | 67.88 | 67.52 | 40.79 |
| T50 | 78.87 | 67.94 | 63.78 | 29.89 |
| T55 | 82.25 | 74.86 | 69.86 | 39.87 |
| T60 | 84.52 | 78.71 | 73.73 | 47.56 |
| T65 | 84.01 | 78.22 | 72.94 | 46.21 |
| T70 | 83.36 | 78.04 | 71.93 | 44.46 |
| T80 | 85.37 | 80.40 | 74.20 | 49.29 |
| T85 | 82.40 | 72.58 | 67.64 | 34.98 |
| T90 | 74.46 | 56.44 | 50.28 | 13.46 |
| T95 | 65.87 | 40.90 | 28.68 | 2.44 |
| T100 | 30.16 | 6.12 | 2.46 | 0.03 |
| T105 | 8.89 | 0.46 | 0 | 0 |
| T110 | 58.36 | 30.13 | 3.30 | 0.10 |
| T115 | 82.89 | 75.19 | 40.02 | 6.80 |
| T120 | 78.21 | 76.08 | 71.36 | 43.74 |

According to the optical lens element of the 21st embodiment of the present disclosure, the transmittance at the wavelength of 850 nm is smaller than the transmittance at the wavelength of 600 nm, the transmittance at the wavelength of 850 nm is smaller than the transmittance at the wavelength of 650 nm, the transmittance at the wavelength of 850 nm is smaller than the transmittance at the wavelength of 700 nm; the transmittance at the wavelength of 900 nm is smaller than the transmittance at the wavelength of 450 nm, the transmittance at the wavelength of 900 nm is smaller than the transmittance at the wavelength of 500 nm, the transmittance at the wavelength of 900 nm is smaller than the transmittance at the wavelength of 550 nm, the transmittance at the wavelength of 900 nm is smaller than the transmittance at the wavelength of 600 nm, the transmittance at the wavelength of 900 nm is smaller than the transmittance at the wavelength of 650 nm, the transmittance at the wavelength of 900 nm is smaller than the transmittance at the wavelength of 700 nm; the transmittance at the wavelength of 950 nm is smaller than the transmittance at the wavelength of 450 nm, the transmittance at the wavelength of 950 nm is smaller than the transmittance at the wavelength of 500 nm, the transmittance at the wavelength of 950 nm is smaller than the transmittance at the wavelength of 550 nm, the transmittance at the wavelength of 950 nm is smaller than the transmittance at the wavelength of 600 nm, the transmittance at the wavelength of 950 nm is smaller than the transmittance at the wavelength of 650 nm, the transmittance at the wavelength of 950 nm is smaller than the transmittance at the wavelength of 700 nm; the transmittance at the wavelength of 1000 nm is smaller than the transmittance at the wavelength of 400 nm, the transmittance at the wavelength of 1000 nm is smaller than the transmittance at the wavelength of 450 nm, the transmittance at the wavelength of 1000 nm is smaller than the transmittance at the wavelength of 500 nm, the transmittance at the wavelength of 1000 nm is smaller than the transmittance at the wavelength of 550 nm, the transmittance at the wavelength of 1000 nm is smaller than the transmittance at the wavelength of 600 nm, the transmittance at the wavelength of 1000 nm is smaller than the transmittance at the wavelength of 650 nm, the transmittance at the wavelength of 1000 nm is smaller than the transmittance at the wavelength of 700 nm; the transmittance at the wavelength of 1050 nm is smaller than the transmittance at the wavelength of 400 nm, the transmittance at the wavelength of 1050 nm is smaller than the transmittance at the wavelength of 450 nm, the transmittance at the wavelength of 1050 nm is smaller than the transmittance at the wavelength of 500 nm, the transmittance at the wavelength of 1050 nm is smaller than the transmittance at the wavelength of 550 nm, the transmittance at the wavelength of 1050 nm is smaller than the transmittance at the wavelength of 600 nm, the transmittance at the wavelength of 1050 nm is smaller than the transmittance at the wavelength of 650 nm, the transmittance at the wavelength of 1050 nm is smaller than the transmittance at the wavelength of 700 nm; the transmittance at the wavelength of 1100 nm is smaller than the transmittance at the wavelength of 400 nm, the transmittance at the wavelength of 1100 nm is smaller than the transmittance at the wavelength of 450 nm, the transmittance at the wavelength of 1100 nm is smaller than the transmittance at the wavelength of 500 nm, the transmittance at the wavelength of 1100 nm is smaller than the transmittance at the wavelength of 550 nm, the transmittance at the wavelength of 1100 nm is smaller than the transmittance at the wavelength of 600 nm, the transmittance at the wavelength of 1100 nm is smaller than the transmittance at the wavelength of 650 nm, the transmittance at the wavelength of 1100 nm is smaller than the transmittance at the wavelength of 700 nm. The transmittance at the wavelength of 1150 nm is smaller than the transmittance at the wavelength of 600 nm, the transmittance at the wavelength of 1150 nm is smaller than the transmittance at the wavelength of 650 nm, the transmittance at the wavelength of 1150 nm is smaller than the transmittance at the wavelength of 700 nm. The transmittance at the wavelength of 1200 nm is smaller than the transmittance at the wavelength of 500 nm, the transmittance at the wavelength of 1200 nm is smaller than the transmittance at the wavelength of 550 nm, the transmittance at the wavelength of 1200 nm is smaller than the transmittance at the wavelength of 600 nm, the transmittance at the wavelength of 1200 nm is smaller than the transmittance at the wavelength of 650 nm, the transmittance at the wavelength of 1200 nm is smaller than the transmittance at the wavelength of 700 nm.

When the average transmittance between the wavelength of 400 nm-700 nm of the optical lens element is T4070, the following conditions can be satisfied: $35\% \leq T4070$; $60\% \leq T4070 < 100\%$; $70\% \leq T4070 \leq 99\%$; $75\% \leq T4070 \leq 99\%$; or $80\% \leq T4070 \leq 95\%$.

When the average transmittance between the wavelength of 500 nm-600 nm of the optical lens element is T5060, the following conditions can be satisfied: $35\% \leq T5060$; $60\% \leq T5060 < 100\%$; $70\% \leq T5060 \leq 99\%$; $75\% \leq T5060 \leq 99\%$; or $80\% \leq T5060 \leq 95\%$.

When the average transmittance between the wavelength of 700 nm-800 nm of the optical lens element is T7080, the following conditions can be satisfied: $35\% \leq T7080$; $60\% \leq T7080 < 100\%$; $70\% \leq T7080 \leq 99\%$; $75\% \leq T7080 \leq 99\%$; or $80\% \leq T7080 \leq 95\%$.

When the average transmittance between the wavelength of 900 nm-1200 nm of the optical lens element is T90120, the following conditions can be satisfied: $0\% \leq T90120 < 100\%$; $0\% \leq T90120 \leq 95\%$; or $5\% \leq T90120 \leq 90\%$.

When the average transmittance between the wavelength of 950 nm-1100 nm of the optical lens element is T95110, the following conditions can be satisfied: $0\% \leq T95110 < 100\%$; $0\% \leq T95110 \leq 95\%$; or $5\% \leq T95110 \leq 90\%$.

When the average transmittance between the wavelength of 1000 nm-1100 nm of the optical lens element is T100110, the following conditions can be satisfied: $0\% \leq T100110 < 100\%$; $0\% \leq T100110 \leq 95\%$; or $5\% \leq T100110 \leq 90\%$.

When the transmittance at the wavelength of 400 nm of the optical lens element is T40, the following conditions can be satisfied: $10\% \leq T40 < 100\%$; $70\% \leq T40 \leq 99\%$; $75\% \leq T40 \leq 99\%$; or $80\% \leq T40 \leq 95\%$.

When the transmittance at the wavelength of 450 nm of the optical lens element is T45, the following conditions can be satisfied: $40\% \leq T45 < 100\%$; $70\% \leq T45 \leq 99\%$; $75\% \leq T45 \leq 99\%$; or $80\% \leq T45 \leq 95\%$.

When the transmittance at the wavelength of 500 nm of the optical lens element is T50, the following conditions can be satisfied: $20\% \leq T50 < 100\%$; $70\% \leq T50 \leq 99\%$; $75\% \leq T50 \leq 99\%$; or $80\% \leq T50 \leq 95\%$.

When the transmittance at the wavelength of 550 nm of the optical lens element is T55, the following conditions can be satisfied: $30\% \leq T55 < 100\%$; $70\% \leq T55 \leq 99\%$; $75\% \leq T55 \leq 99\%$; or $80\% \leq T55 \leq 95\%$.

When the transmittance at the wavelength of 600 nm of the optical lens element is T60, the following conditions can be satisfied: $40\% \leq T60 < 100\%$; $70\% \leq T60 \leq 99\%$; $75\% \leq T60 \leq 99\%$; or $80\% \leq T60 \leq 95\%$.

When the transmittance at the wavelength of 650 nm of the optical lens element is T65, the following conditions can be satisfied: $40\% \leq T65 < 100\%$; $70\% \leq T65 \leq 99\%$; $75\% \leq T65 \leq 99\%$; or $80\% \leq T65 \leq 95\%$.

When the transmittance at the wavelength of 700 nm of the optical lens element is T70, the following conditions can be satisfied: $40\% \leq T70 < 100\%$; $70\% \leq T70 \leq 99\%$; $75\% \leq T70 \leq 99\%$; or $80\% \leq T70 \leq 95\%$.

When the transmittance at the wavelength of 800 nm of the optical lens element is T80, the following conditions can be satisfied: 0%≤T80<100%; 0%≤T80≤95%; or 5%≤T80≤90%.

When the transmittance at the wavelength of 850 nm of the optical lens element is T85, the following conditions can be satisfied: 0%≤T85<100%; 0%≤T85≤95%; or 5%≤T85≤90%.

When the transmittance at the wavelength of 900 nm of the optical lens element is T90, the following conditions can be satisfied: 0%≤T90<100%; 0%≤T90≤95%; or 5%≤T90≤90%.

When the transmittance at the wavelength of 950 nm of the optical lens element is T95, the following conditions can be satisfied: 0%≤T95<100%; 0%≤T95≤95%; or 5%≤T95≤90%.

When the transmittance at the wavelength of 1000 nm of the optical lens element is T100, the following conditions can be satisfied: 0%≤T100<100%; 0%≤T100≤95%; or 5%≤T100≤90%.

When the transmittance at the wavelength of 1050 nm of the optical lens element is T105, the following conditions can be satisfied: 0%≤T105<100%; 0%≤T105≤95%; or 5%≤T105≤90%.

When the transmittance at the wavelength of 1100 nm of the optical lens element is T110, the following conditions can be satisfied: 0%≤T110<100%; 0%≤T110≤95%; or 5%≤T110≤90%.

When the transmittance at the wavelength of 1150 nm of the optical lens element is T115, the following conditions can be satisfied: 0%≤T115<100%; 0%≤T115≤95%; or 5%≤T115≤90%.

When the transmittance at the wavelength of 1200 nm of the optical lens element is T120, the following conditions can be satisfied: 0%≤T120<100%; 0%≤T120≤95%; or 5%≤T120≤90%.

The transmittance at the wavelength of 600 nm-1200 nm of the optical lens element including the infrared filtering coating and the optical lens assembly including the optical lens element including the infrared filtering coating and the optical lens element including the long-wavelength absorbing material is shown in Table 28 below.

TABLE 28

| Wavelength (nm) | Optical Lens Element Including Infrared Filtering Coating | | Optical Lens Assembly Including Optical lens element including Infrared Filtering Coating and Optical Lens Element Including Long-Wavelength Absorbing Material | |
|---|---|---|---|---|
| | Transmittance (%, 0 degrees) | Transmittance (%, 30 degrees) | Transmittance (%, 0 degrees) | Transmittance (%, 30 degrees) |
| 600 | 84.52 | 78.71 | 73.73 | 47.56 |
| 605 | 84.62 | 78.92 | 74.33 | 48.53 |
| 610 | 84.70 | 79.48 | 74.71 | 49.67 |
| 615 | 84.87 | 79.88 | 75.22 | 50.90 |
| 620 | 85.01 | 80.10 | 75.56 | 51.72 |
| 625 | 84.94 | 80.29 | 75.61 | 52.41 |
| 630 | 84.98 | 80.18 | 75.54 | 52.01 |
| 635 | 84.96 | 79.94 | 75.02 | 51.12 |
| 640 | 84.77 | 79.53 | 74.76 | 49.73 |
| 645 | 84.50 | 79.16 | 73.86 | 48.22 |
| 650 | 84.01 | 78.22 | 72.94 | 46.21 |
| 655 | 83.63 | 77.69 | 72.34 | 45.10 |
| 660 | 83.59 | 77.27 | 71.64 | 43.48 |
| 665 | 83.34 | 76.74 | 71.15 | 42.74 |
| 670 | 83.25 | 76.60 | 71.08 | 42.12 |
| 675 | 83.05 | 76.87 | 71.01 | 42.28 |
| 680 | 83.44 | 77.28 | 70.99 | 42.83 |
| 685 | 83.43 | 77.67 | 71.55 | 43.50 |
| 690 | 83.47 | 78.00 | 71.70 | 44.22 |
| 695 | 83.41 | 77.99 | 71.91 | 44.44 |
| 700 | 83.36 | 78.04 | 71.93 | 44.46 |
| 705 | 83.36 | 78.06 | 71.84 | 44.18 |
| 710 | 83.59 | 78.28 | 71.51 | 43.50 |
| 715 | 83.84 | 78.56 | 71.43 | 43.38 |
| 720 | 84.13 | 78.93 | 71.18 | 42.95 |
| 725 | 84.40 | 79.11 | 71.03 | 42.53 |
| 730 | 84.65 | 79.19 | 70.99 | 42.70 |
| 735 | 84.71 | 79.36 | 70.96 | 42.19 |
| 740 | 84.81 | 79.62 | 71.08 | 42.19 |
| 745 | 85.01 | 79.83 | 70.99 | 42.39 |
| 750 | 85.15 | 80.08 | 71.12 | 42.30 |
| 755 | 85.41 | 80.11 | 71.31 | 43.37 |
| 760 | 85.41 | 80.24 | 71.65 | 43.57 |
| 765 | 85.51 | 80.44 | 71.91 | 44.88 |
| 770 | 85.61 | 80.61 | 72.33 | 45.17 |
| 775 | 85.76 | 80.63 | 72.72 | 45.80 |
| 780 | 85.70 | 80.75 | 73.02 | 47.17 |
| 785 | 85.72 | 80.77 | 73.39 | 47.77 |
| 790 | 85.55 | 80.70 | 73.52 | 48.13 |
| 795 | 85.48 | 80.58 | 73.77 | 49.11 |
| 800 | 85.37 | 80.40 | 74.20 | 49.29 |
| 805 | 84.99 | 79.94 | 73.97 | 48.53 |
| 810 | 84.94 | 79.83 | 73.84 | 48.57 |
| 815 | 84.64 | 79.22 | 74.00 | 48.26 |

TABLE 28-continued

| | Optical Lens Element Including Infrared Filtering Coating | | Optical Lens Assembly Including Optical lens element including Infrared Filtering Coating and Optical Lens Element Including Long-Wavelength Absorbing Material | |
|---|---|---|---|---|
| Wavelength (nm) | Transmittance (%, 0 degrees) | Transmittance (%, 30 degrees) | Transmittance (%, 0 degrees) | Transmittance (%, 30 degrees) |
| 820 | 84.34 | 78.68 | 73.60 | 46.80 |
| 825 | 84.06 | 77.87 | 72.64 | 46.62 |
| 830 | 83.89 | 77.02 | 72.16 | 44.56 |
| 835 | 83.38 | 76.10 | 71.60 | 43.12 |
| 840 | 83.15 | 74.93 | 71.15 | 41.97 |
| 845 | 82.67 | 73.72 | 69.88 | 40.05 |
| 850 | 82.40 | 72.58 | 67.64 | 34.98 |
| 855 | 81.67 | 70.94 | 64.62 | 31.03 |
| 860 | 81.20 | 69.65 | 63.90 | 29.17 |
| 865 | 80.47 | 68.14 | 61.80 | 27.13 |
| 870 | 79.68 | 66.49 | 60.56 | 24.60 |
| 875 | 78.91 | 64.67 | 59.10 | 22.47 |
| 880 | 78.01 | 63.00 | 57.44 | 20.84 |
| 885 | 77.19 | 61.37 | 55.46 | 18.51 |
| 890 | 76.15 | 59.64 | 54.26 | 16.98 |
| 895 | 75.25 | 57.95 | 51.83 | 14.94 |
| 900 | 74.46 | 56.44 | 50.28 | 13.46 |
| 905 | 73.75 | 55.13 | 48.21 | 11.60 |
| 910 | 73.02 | 53.80 | 46.28 | 10.68 |
| 915 | 72.49 | 52.67 | 44.30 | 9.07 |
| 920 | 71.85 | 51.64 | 42.41 | 7.81 |
| 925 | 71.36 | 50.56 | 40.72 | 6.71 |
| 930 | 70.79 | 49.34 | 38.87 | 5.74 |
| 935 | 69.90 | 47.85 | 36.32 | 4.77 |
| 940 | 68.94 | 46.00 | 33.94 | 3.71 |
| 945 | 67.54 | 43.66 | 31.36 | 2.87 |
| 950 | 65.87 | 40.90 | 28.68 | 2.44 |
| 955 | 63.62 | 37.49 | 25.30 | 1.69 |
| 960 | 61.04 | 33.80 | 22.23 | 1.12 |
| 965 | 58.10 | 29.97 | 19.02 | 0.79 |
| 970 | 54.91 | 26.06 | 16.11 | 0.50 |
| 975 | 51.16 | 21.96 | 13.07 | 0.30 |
| 980 | 47.31 | 18.13 | 10.16 | 0.16 |
| 985 | 43.26 | 14.65 | 7.74 | 0 |
| 990 | 38.91 | 11.40 | 5.78 | 0.05 |
| 995 | 34.35 | 8.45 | 4.15 | 0.01 |
| 1000 | 30.16 | 6.12 | 2.46 | 0.03 |
| 1005 | 26.52 | 4.39 | 1.66 | 0 |
| 1010 | 23.28 | 3.17 | 1.04 | 0 |
| 1015 | 20.35 | 2.29 | 0.71 | 0 |
| 1020 | 17.78 | 1.70 | 0.48 | 0 |
| 1025 | 15.36 | 1.25 | 0.28 | 0 |
| 1030 | 13.01 | 0.87 | 0.14 | 0.17 |
| 1035 | 10.88 | 0.63 | 0.05 | 0.03 |
| 1040 | 9.34 | 0.53 | 0.22 | 0 |
| 1045 | 8.67 | 0.41 | 0 | 0 |
| 1050 | 8.89 | 0.46 | 0 | 0 |
| 1055 | 10.35 | 0.59 | 0.07 | 0.29 |
| 1060 | 13.08 | 1.00 | 0 | 0 |
| 1065 | 16.89 | 1.83 | 0 | 0 |
| 1070 | 21.82 | 3.23 | 0.04 | 0.03 |
| 1075 | 27.80 | 5.50 | 0 | 0 |
| 1080 | 34.20 | 8.68 | 0.26 | 0.19 |
| 1085 | 40.56 | 12.82 | 0.85 | 0 |
| 1090 | 46.85 | 17.80 | 1.10 | 0 |
| 1095 | 53.00 | 23.80 | 1.77 | 0.14 |
| 1100 | 58.36 | 30.13 | 3.30 | 0.10 |
| 1105 | 63.12 | 36.38 | 4.74 | 0.22 |
| 1110 | 67.42 | 42.93 | 6.99 | 0 |
| 1115 | 71.36 | 49.34 | 10.17 | 0.44 |
| 1120 | 74.55 | 55.11 | 13.14 | 0.44 |
| 1125 | 77.11 | 60.08 | 16.73 | 0.79 |
| 1130 | 79.02 | 64.44 | 21.21 | 1.21 |
| 1135 | 80.61 | 68.12 | 25.71 | 1.75 |
| 1140 | 81.63 | 71.06 | 30.36 | 3.36 |
| 1145 | 82.34 | 73.26 | 35.21 | 4.72 |
| 1150 | 82.89 | 75.19 | 40.02 | 6.80 |
| 1155 | 83.16 | 76.58 | 45.03 | 9.60 |
| 1160 | 83.08 | 77.39 | 49.12 | 12.69 |
| 1165 | 82.36 | 77.46 | 52.84 | 16.03 |
| 1170 | 81.10 | 76.79 | 56.54 | 19.96 |

TABLE 28-continued

|  | Optical Lens Element Including Infrared Filtering Coating | | Optical Lens Assembly Including Optical lens element including Infrared Filtering Coating and Optical Lens Element Including Long-Wavelength Absorbing Material | |
|---|---|---|---|---|
| Wavelength (nm) | Transmittance (%, 0 degrees) | Transmittance (%, 30 degrees) | Transmittance (%, 0 degrees) | Transmittance (%, 30 degrees) |
| 1175 | 79.31 | 75.70 | 59.83 | 24.20 |
| 1180 | 77.79 | 74.59 | 62.76 | 28.39 |
| 1185 | 76.85 | 74.06 | 65.09 | 32.42 |
| 1190 | 76.81 | 74.19 | 67.81 | 36.21 |
| 1195 | 77.38 | 75.03 | 69.98 | 40.34 |
| 1200 | 78.21 | 76.08 | 71.36 | 43.74 |

The transmittance of the present disclosure is the transmittance of the optical lens element group, or the transmittance of the optical lens element group further including the optical element. An anti-reflective coating, such as a high-low refractive index coating layer, a subwavelength structural coating layer or the combination thereof, can be further disposed on the surface of the optical lens element.

According to the present disclosure, with the best design of controlling the incident angles within the all fields at the surface of the optical lens element, and with the analysis of the incident angle of the chief ray at the surface of the optical lens element, specific wavelength filtering coating is arranged on the best surface of the optical lens element and the long-wavelength absorbing material is added into the best optical lens element, it is favorable for solving the light-leakage problem of the conventional optical lens element with the infrared filtering coating. Moreover, the blue glass element is directly cut off, which helps the miniaturization of the optical lens assembly. It not only reduces the manufacturing cost of the optical lens assembly, but also prevents the problems such as broken or damage of the glass element. According to the present disclosure, it is able to decide which surface of the optical lens elements is most suitable for the technique of arranging the coating. The best manufacturing result of the infrared filtering coating can be obtained. The proper filtering effect can be achieved and the strong light reflection can be reduced under the condition of most uniform coating on the surface of the optical lens element, which can effectively improve the imaging quality of the entire optical lens element. According to the present disclosure, by controlling the slight change of the surface shape of the optical lens elements, it is favorable for solving the defect of stray light caused by severe strong light reflection. According to the present disclosure, the best track length data of each of the optical lens elements is further analyzed to obtain the most favorable absorbing material arranging factor, which effectively solves the defect of light-leakage from large-angle incident light.

The infrared filtering coating of the present disclosure can be additionally coated on the surfaces of other elements, such as the cover glass, a protective glass, a plastic board, a glass board or a reflective element. A complete filtering effect is obtained after the infrared filtering coating on other element surface completes the insufficient wavelength region. Therefore, the coating on the surface of the optical lens elements can be used for filtering out the specific wavelength region to reduce the number of coating layers and thickness. After arranging the optical lens elements with absorbing materials, a complete desired filtering effect is achieved by combining the respective filtering effects of the multiple elements.

According to the present disclosure, the optical lens element can be manufactured by the cover glass being disposed on the surface of the image sensor (the image surface of the optical lens element), with the combination of the optical lens element including the long-wavelength absorbing material and the infrared filter coating made onto the surface of the optical lens element. It is favorable for the optical lens assembly to reduce the angle of the chief ray in the all fields of maximum image height incident into the image sensor, which achieving the effect of reducing the back focal length and total length. In order to obtain similar or the same refractive indices of the cover glass and the surface of the image sensor, a polymer can be arranged between the image sensor and the cover glass to make the refractive index thereof close to or the same as the refractive index of the cover glass. Therefore, light can pass through the interface between the cover glass and the image sensor directly without being refracted, so as to avoid second refraction which causes the incident angle increasing.

According to the present disclosure, there can be an air layer or without air layer between the cover glass and the image sensor of the optical lens assembly. When the optical lens assembly of the present disclosure is designed as an optical system with the air layer between the cover glass and the image sensor, the anti-reflective coating can be manufactured on at least one or both surfaces of the object-side surface and the image-side surface of the cover glass. When the optical lens assembly of the present disclosure is designed as an optical system without the air layer between the cover glass and the image sensor, the anti-reflective coating can be manufactured on the object-side surface of the cover glass.

In the optical lens element or the optical element of the optical lens assembly according to the present disclosure, the optical element can be an element which visible light can penetrate, such as the cover glass, the micro lens, the blue glass, a filter and a color filter. The object-side surface or the image-side surface of the optical element can include the anti-reflective coating. The anti-reflective coating includes at least one coating layer, which can be a combination of high refractive index coating layer and low refractive index coating layer arranged in alternation, the subwavelength structure, a combination of high refractive index coating layer and subwavelength structure, a combination of low refractive index coating layer and subwavelength structure, or a combination of high refractive index coating layer, low refractive index coating layer and subwavelength structure.

According to the present disclosure, the anti-reflective coating of the optical lens assembly can include the subwavelength structure on the outside (adjacent to the air), and the material thereof can be metal oxide such as aluminum oxide ($Al_2O_3$). The subwavelength structure of the anti-reflective coating includes a plurality of holes. The sizes of the holes adjacent to the outside of the anti-reflective coating are larger than the sizes of the holes adjacent to the inside of the anti-reflective coating. The anti-reflective coating in the optical lens assembly of the present disclosure can include other coating layers on the inside (adjacent to the substrate), such as a high refractive index coating layer and a low refractive index coating layer.

According to the present disclosure, the object-side surface or the image-side surface of the optical lens element or the optical element, such as the cover glass, the micro lens, the blue glass and the filtering element, of the optical lens assembly can include the infrared filtering coating. The infrared filtering coating includes at least one coating layer, which can be a combination of high refractive index coating layer and low refractive index coating layer arranged in alternation.

According to the high refractive index coating layer and the low refractive index coating layer of the present disclosure, the refractive index of the material of the high refractive index coating layer can be greater than 1.80, and the refractive index of the material of the low refractive index coating layer can be smaller than 1.80. For example, the material of the anti-reflective coating (refractive index at the wavelength of 587.6 nm) can be: $MgF_2$ (1.37), $SiO_2$ (1.45), $Al_2O_3$ (1.76), $HfO_2$ (1.89), ZnO (1.92), $Sc_2O_3$ (1.98), AlN (2.02), $Si_3N_4$ (2.03), $Ta_2O_5$ (2.13), $ZrO_2$ (2.15), ZnS (2.27), $Nb_2O_5$ (2.34), $TiO_2$ (2.61) or TiN (3.13).

According to the present disclosure, the optical lens element of the optical lens assembly can include the long-wavelength absorbing material. The infrared filtering coating can be manufactured on at least one or both surfaces of the object-side surface and the image-side surface of the optical lens element.

According to the present disclosure, the optical lens element of the optical lens assembly can include the long-wavelength absorbing material. The infrared filtering coating can be manufactured on at least one or both surfaces of the object-side surface and the image-side surface of the optical lens element. It can be further designed that the blue glass is disposed at an object side of the image sensor.

According to the present disclosure, the optical lens element of the optical lens assembly can include the long-wavelength absorbing material. The infrared filtering coating can be manufactured on at least one or both surfaces of the object-side surface and the image-side surface of the optical lens element. It can be further designed that the cover glass is disposed at an object side of the image sensor. An anti-reflective coating can be manufactured on at least one or both surfaces of the object-side surface and the image-side surface of the cover glass.

According to the optical lens assembly of the present disclosure, the long-wavelength absorbing material can be arranged on at least one or both surfaces of the object-side surface and the image-side surface of the cover glass. The long-wavelength absorbing material is mixed with the polymer, and the polymer is arranged at the surface of the cover glass. The infrared filtering coating can be manufactured on at least one or both surfaces of the object-side surface and the image-side surface of the optical lens element. Furthermore, the multiple cover glasses can be designed to include the long-wavelength absorbing material, and the surface of the cover glass can further be designed to include the anti-reflective coating. There can be an air layer or without air layer between the cover glass and the image sensor.

When the optical lens assembly of the present disclosure is designed as an optical system with the air layer between the cover glass and the image sensor, a long-wavelength absorbing material coating layer can be designed on at least one or both surfaces of the object-side surface and the image-side surface of the cover glass. The surface of the cover glass can further be designed to include the anti-reflective coating. When the optical lens assembly of the present disclosure is designed as an optical system without the air layer between the cover glass and the image sensor, the long-wavelength absorbing material coating layer can be designed on the object-side surface of the cover glass. The surface of the cover glass can further be designed to include the anti-reflective coating.

According to the optical lens assembly of the present disclosure, the long-wavelength absorbing material is mixed with the polymer, and the polymer mixture is arranged on at least one or both surfaces of the object-side surface and the image-side surface of the optical lens element. The coating technique of the polymer mixture on the surface of the optical lens element can be physical coating processes, spraying or other coating processes. For example, the other coating processes can be the spin coating, dip coating, spray painting, thermal spraying, inkjet printing, Langmuir-Blodgett method, etc. The infrared filtering coating includes at least one coating layer, which can be an infrared filtering coating film of the polymer mixture. Furthermore, the optical lens assembly can be further designed that the cover glass is disposed at an object side of the image sensor. An anti-reflective coating can be manufactured on at least one or both surfaces of the object-side surface and the image-side surface of the cover glass.

According to the optical lens assembly of the present disclosure, the long-wavelength absorbing material can be arranged on the surface of the micro lens. For example, the long-wavelength absorbing material is mixed with the polymer, and the polymer is arranged at the surface of the micro lens. The infrared filtering coating can be manufactured on at least one or both surfaces of the object-side surface and the image-side surface of the optical lens element. It can be further designed that the cover glass is disposed on the surface of the image sensor, so as to effectively protect the image sensor.

According to the optical lens assembly of the present disclosure, the long-wavelength absorbing material can be arranged at an object side of the micro lens. The long-wavelength absorbing material is mixed with the polymer, and the polymer is arranged between the micro lens and the color filter as a connecting layer. The long-wavelength absorbing material can also be mixed and arranged in the color filter, and it can be chosen to arrange the long-wavelength absorbing material in the part of red, green and blue filters, or only in the part of red filter.

According to the present disclosure, the filtering element is an optical element that can filter out the light with a specific wavelength range, such as a color filter as a part of the image sensor, an infrared filtering element, the blue glass, a narrow wavelength filtering element, a short wavelength filtering element or a long wavelength filtering element.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications, variations, combinations and permutations are possible in view of the above teachings.

What is claimed is:

1. An optical lens assembly, comprising:
   at least three optical lens elements;
   wherein at least one of the optical lens elements comprises an infrared filtering coating, the optical lens element comprising the infrared filtering coating is made of a plastic material, the infrared filtering coating is arranged on an object-side surface or an image-side surface of the optical lens element, a surface of the optical lens element comprising the infrared filtering coating is aspheric, and the infrared filtering coating comprises at least two different refractive indices;
   wherein at least one of the optical lens elements comprises a long-wavelength absorbing material, and the optical lens element comprising the long-wavelength absorbing material is made of a plastic material;
   wherein a maximum of an incident angle of a chief ray in all fields on the surface of the optical lens element comprising the infrared filtering coating is AICmax, an average transmittance between a wavelength of 500 nm-600 nm of the optical lens assembly is T5060, an average transmittance between a wavelength of 700 nm-1000 nm of the optical lens assembly is T70100, and the following conditions are satisfied:
   AICmax≤40 degrees;
   80%≤T5060; and
   T70100≤10%;
   wherein a major coating arranging factor of each of surfaces of the optical lens elements is FC, and at least one of the surfaces of the optical lens element comprising the infrared filtering coating satisfies the following condition:

0.96≤FC.

2. The optical lens assembly of claim 1, wherein the major coating arranging factor of each of the surfaces of the optical lens elements is FC, and at least one of the surfaces of the optical lens element comprising the infrared filtering coating satisfies the following condition:

1≤FC≤100.

3. The optical lens assembly of claim 2, wherein a first coating arranging factor of each of the surfaces of the optical lens elements is Fc1, and at least one of the surfaces of the optical lens element comprising the infrared filtering coating satisfies the following condition:

1.82≤Fc1.

4. The optical lens assembly of claim 3, wherein a second coating arranging factor of each of the surfaces of the optical lens elements is Fc2, and at least one of the surfaces of the optical lens element comprising the infrared filtering coating satisfies the following condition:

4.98≤Fc2.

5. The optical lens assembly of claim 2, wherein the surface of the optical lens element comprising the infrared filtering coating is without inflection point or critical point in an off-axis region thereof.

6. The optical lens assembly of claim 2, wherein a total number of coating layers of the infrared filtering coating is tLs, and the following condition is satisfied:

40<tLs≤80.

7. The optical lens assembly of claim 2, wherein a total thickness of coating layers of the infrared filtering coating is tTk, and the following condition is satisfied:

4000 nm<tTk≤10000 nm.

8. The optical lens assembly of claim 2, wherein the optical lens element comprising the infrared filtering coating is a correcting lens element.

9. The optical lens assembly of claim 2, wherein a field of view of the optical lens assembly is FOV, and the following condition is satisfied:

60 degrees≤FOV≤200 degrees.

10. The optical lens assembly of claim 1, wherein a major absorbing material arranging factor of each of the optical lens elements is FA, and the optical lens element comprising the long-wavelength absorbing material satisfies the following condition:

2.31≤FA.

11. The optical lens assembly of claim 10, wherein an average of a track length ratio of a chief ray in all fields of each of the optical lens elements is CPavg, and the optical lens element comprising the long-wavelength absorbing material satisfies the following condition:

0.9≤CPavg≤1.1.

12. The optical lens assembly of claim 10, wherein a wavelength of 50% transmittance of the long-wavelength absorbing material is shorter than a wavelength of 50% transmittance of the infrared filtering coating, and a difference between the wavelength of 50% transmittance of the long-wavelength absorbing material and the wavelength of 50% transmittance of the infrared filtering coating is more than 20 nm.

13. The optical lens assembly of claim 10, wherein the optical lens element comprising the long-wavelength absorbing material is closer to an object side of the optical lens assembly than the surface of the optical lens element comprising the infrared filtering coating.

14. The optical lens assembly of claim 10, wherein a wavelength of 50% transmittance of the optical lens assembly in a long wavelength region where wavelength and transmittance are negatively correlated is LWdT5, and the following condition is satisfied:

600 nm≤LWdT5≤700 nm.

15. The optical lens assembly of claim 10, wherein at least one of the optical lens elements comprises a short-wavelength absorbing material.

16. An imaging apparatus, comprising:
    the optical lens assembly of claim 1; and
    an image sensor disposed on an image surface of the optical lens assembly.

17. An electronic device, which is a mobile device, and the electronic device comprising:
    the imaging apparatus of claim 16.

18. The optical lens assembly of claim 1, further comprising:
    an image sensor disposed on an image surface of the optical lens assembly; and
    a cover glass disposed on a surface of the image sensor.

19. The optical lens assembly of claim 18, wherein an angle of a chief ray in a field of maximum image height of the optical lens assembly incident into a surface of the cover glass is CRAg, and the following condition is satisfied:

40 degrees≤CRAg.

20. The optical lens assembly of claim 18, wherein an object-side surface of the cover glass comprises a long-wavelength absorbing material.

21. The optical lens assembly of claim 18, wherein at least one surface of the cover glass comprises an anti-reflective coating, and the anti-reflective coating comprises a sub-wavelength structure.

22. The optical lens assembly of claim 18, wherein an image-side surface of the cover glass comprises a long-wavelength absorbing material.

23. An electronic device, which is a mobile device, and the electronic device comprising:

the optical lens assembly of claim 18.

24. The optical lens assembly of claim 1, wherein a transmittance at a wavelength of 1050 nm of the optical lens element comprising the long-wavelength absorbing material of the optical lens assembly is smaller than a transmittance at a wavelength of 500 nm thereof, and the optical lens assembly further comprises:

an image sensor disposed on an image surface of the optical lens assembly.

25. An electronic device, which is a mobile device, and the electronic device comprising:

the optical lens assembly of claim 24.

* * * * *